(12) United States Patent
Tsivion et al.

(10) Patent No.: US 12,714,129 B2
(45) Date of Patent: Aug. 25, 2026

(54) SWEETENER CONCENTRATE FORMULATIONS

(71) Applicant: INCREDO LTD., Petach Tikva (IL)

(72) Inventors: David Tsivion, Kfar Shmaryahu (IL); Liron Bitan, Shoham (IL); Naama Lahav, Hod Hasharon (IL); Alexander Trachtenberg, Ramat Gan (IL); Moran Fattal, Tel Aviv (IL)

(73) Assignee: INCREDO LTD., Petach Tikva (IL)

( * ) Notice: Subject to any disclaimer, the term of this patent is extended or adjusted under 35 U.S.C. 154(b) by 165 days.

(21) Appl. No.: 18/579,350

(22) PCT Filed: Aug. 5, 2022

(86) PCT No.: PCT/IB2022/057310
§ 371 (c)(1),
(2) Date: Jan. 14, 2024

(87) PCT Pub. No.: WO2023/012741
PCT Pub. Date: Feb. 9, 2023

(65) Prior Publication Data

US 2024/0334960 A1 Oct. 10, 2024

Related U.S. Application Data

(60) Provisional application No. 63/316,015, filed on Mar. 3, 2022, provisional application No. 63/253,133, filed
(Continued)

(51) Int. Cl.
*A23L 27/30* (2016.01)
*A21D 2/18* (2006.01)
(Continued)

(52) U.S. Cl.
CPC .............. *A23L 27/31* (2016.08); *A21D 2/181* (2013.01); *A21D 2/262* (2013.01); *A21D 2/263* (2013.01);
(Continued)

(58) Field of Classification Search
CPC .......... A23L 27/31; A23L 25/30; A23L 27/88; A23L 27/33; A23L 27/34; A21D 2/181;
(Continued)

(56) References Cited

U.S. PATENT DOCUMENTS

| | | | |
|---|---|---|---|
| 4,863,745 | A | 9/1989 | Zibell |
| 2006/0073254 | A1 | 4/2006 | Catani |

(Continued)

FOREIGN PATENT DOCUMENTS

| | | | |
|---|---|---|---|
| AU | 2005294654 | A1 | 4/2006 |
| CN | 101072515 | A | 11/2007 |

(Continued)

OTHER PUBLICATIONS

Translation of CN-110662428-A (Year: 2020).*
(Continued)

*Primary Examiner* — Brent T O'Hern
(74) *Attorney, Agent, or Firm* — Momentum IP Ltd.; Marc Van Dyke

(57) ABSTRACT

Sweetener concentrates, sweetener formulations, and sweetened food formulations and products, the sweetener formulation comprising: (a) sweetener particles containing a first sweetener, and (b) crystalline sugar particles; wherein at least one protein is disposed within the sweetener particles; wherein a first weight ratio of the at least one protein to the first sweetener is within a range of 0.01:1 to 20:1; and wherein, within the sweet formulation, at least 40% of the total amount of sweetener, by weight, is crystalline.

20 Claims, 3 Drawing Sheets

Related U.S. Application Data on Oct. 7, 2021, provisional application No. 63/229,614, filed on Aug. 5, 2021.

(51) Int. Cl.
*A21D 2/26* (2006.01)
*A21D 13/062* (2017.01)
*A23L 25/00* (2016.01)
*A23L 27/00* (2016.01)

(52) U.S. Cl.
CPC ............ *A21D 2/265* (2013.01); *A21D 2/266* (2013.01); *A21D 13/062* (2013.01); *A23L 25/30* (2016.08); *A23L 27/33* (2016.08); *A23L 27/34* (2016.08); *A23L 27/88* (2016.08)

(58) Field of Classification Search
CPC ........ A21D 2/262; A21D 2/263; A21D 2/265; A21D 2/266; A21D 13/062
USPC .......................................................... 426/549
See application file for complete search history.

(56) References Cited

U.S. PATENT DOCUMENTS

| | | | |
|---|---|---|---|
| 2008/0213452 | A1 | 9/2008 | Miles |
| 2009/0297670 | A1 | 12/2009 | Baniel |
| 2010/0255154 | A1 | 10/2010 | Diguet |
| 2013/0266718 | A1 | 10/2013 | van der Vegt |
| 2014/0004244 | A1 | 1/2014 | Putter |
| 2016/0242439 | A1 | 8/2016 | Baniel |
| 2018/0249744 | A1 | 9/2018 | Baniel |
| 2019/0000123 | A1 | 1/2019 | Baniel |
| 2019/0021381 | A1 | 1/2019 | Baniel |
| 2019/0343155 | A1 | 11/2019 | Shi |
| 2020/0370138 | A1 | 11/2020 | Kannar |
| 2021/0076723 | A1 | 3/2021 | Dupas-Langlet |
| 2021/0153533 | A1 | 5/2021 | Kannar |
| 2022/0256900 | A1 | 8/2022 | Sundaresan |
| 2024/0268427 | A1 | 8/2024 | Tsivion |
| 2024/0334960 | A1 | 10/2024 | Tsivion |

FOREIGN PATENT DOCUMENTS

| | | | | | |
|---|---|---|---|---|---|
| CN | 103704685 | A | | 4/2014 | |
| CN | 110662428 | A | * | 1/2020 | .............. A23G 3/44 |
| EP | 1142486 | A2 | | 10/2001 | |
| EP | 2689674 | A1 | | 1/2014 | |
| WO | 2020/251928 | A1 | | 12/2020 | |
| WO | 2021/198984 | A1 | | 10/2021 | |

OTHER PUBLICATIONS

Moskowitz, H.R., Ratio Scales of Sugar Sweetness, Attention, Perception & Psychophysics, 1970, 7(5). DOI: 10.3758/BF03210175.

Madsen, F., Eberth, K. and Smart, J.D., A rheological examination of the mucoadhesive/mucus interaction: the effect of mucoadhesive type and concentration, Journal of Controlled Release, 1998, 50(1), 167-178.

Khutoryanskiy, V.V. (Ed.), Mucoadhesive Materials and Drug Delivery Systems, Wiley, 2014.

Neyraud, E., Role of Saliva in Oral Food Perception, Monographs in Oral Science, Karger, Basel, 2014, vol. 24, pp. 61-70. DOI: 10.1159/000358789.

Hsein, H., Garrait, G., Beyssac, E. and Hoffart, V., Whey protein mucoadhesive properties for oral drug delivery: mucin-whey protein interaction and mucoadhesive bond strength, Colloids and Surfaces B: Biointerfaces, 2015, 136, 799-808.

Da Silva, J.B., Ferreira, S.B.S., De Freitas, O. and Bruschi, M.L., A critical review about methodologies for the analysis of mucoadhesive properties of drug delivery systems, Drug Development and Industrial Pharmacy, 2017. DOI: 10.1080/03639045.2017.1294600.

Mackie, A., Goycoolea, F.M., Menchicchi, B., Caramella, C.M., Saporito, F., Lee, S., Boutrup Stephansen, K., Chronakis, I.S., Hiorth, M. and Adamczak, M., Innovative Methods and Applications in Mucoadhesion Research, Macromolecular Bioscience, 2017, 17(8), 1600534. DOI: 10.1002/mabi.201600534.

Marxen, E., Mosgaard, M.D., Pedersen, A.M.L. and Jacobsen, J., Mucin dispersions as a model for the oromucosal mucus layer in in vitro and ex vivo buccal permeability studies of small molecules, European Journal of Pharmaceutics and Biopharmaceutics, 2017. DOI: 10.1016/j.ejpb.2017.09.016.

Schattling, P., Taipaleenmaki, E., Zhang, Y. and Stadler, B., A Polymer Chemistry Point of View on Mucoadhesion and Mucopenetration, Macromolecular Bioscience, 2017, 17, 1700060.

Cook, S.L., Bull, S.P., Methven, L., Parker, J.K. and Khutoryanskiy, V.V., Mucoadhesion: A food perspective, Food Hydrocolloids, 2017, 72, 281-296.

Bourbon, A.I., Pereira, R.N., Pastrana, L.M., Vicente, A.A. and Cerqueira, M.A., Protein-Based Nanostructures for Food Applications, Gels, 2019, 5(1), 9. DOI: 10.3390/gels5010009.

Ahmed, S. (Ed.), Alginates: Applications in the Biomedical and Food Industries, Wiley/Scrivener Publishing, 2019.

PCT search report for PCT/IB2022/057310 which mailed on Nov. 14, 2022.

PCT search opinion for PCT/IB2022/057310 which mailed on Nov. 14, 2022.

* cited by examiner

SWEETENER CONCENTRATE FORMULATIONS

This application draws priority from U.S. patent application Ser. No. 63/229,614, filed Aug. 5, 2021; U.S. patent application Ser. No. 63/253,133, filed Oct. 7, 2021; U.S. patent application Ser. No. 63/316,015, filed Mar. 3, 2022; which applications are incorporated by reference for all purposes as if fully set forth herein.

FIELD AND BACKGROUND OF THE INVENTION

The present invention primarily relates to food formulations and sweetener formulations therefor, to sweetener concentrate formulations containing one or more proteins disposed in the sweetener particles, and to sweetener and food formulations containing such sweetener concentrate formulations.

The present inventors have recognized a need for improved sweetener formulations and for improved food formulations containing such improved sweetener formulations.

SUMMARY OF THE INVENTION

According to aspects of the invention there is provided a formulation comprising sweetener particles, the sweetener particles including crystalline sucrose; and (b) optionally, amorphous sucrose; wherein a total amount of sucrose within the sweetener particles is defined as the crystalline sucrose and the amorphous sucrose; wherein protein is disposed as protein particles in the sweetener particles; and wherein, within a population of the sweetener particles: (i) a first weight ratio of the protein to the total amount of sucrose is within a range of 0.01:1 to 20:1; and (ii) a second weight ratio of the amorphous sucrose to the crystalline sucrose is at most 3.3:1.

According to further aspects of the invention there is provided a formulation comprising: (a) sweetener particles containing a first sweetener; and (b) crystalline sugar particles; wherein at least one protein is disposed within the sweetener particles; wherein a first weight ratio of the at least one protein to the first sweetener is within a range of 0.01:1 to 20:1; and wherein, within the sweet formulation, at least 40% of the total amount of sweetener, by weight, is crystalline.

According to further aspects of the invention there is provided a food formulation comprising: (a) first sweetener particles containing a first sweetener, and at least one protein disposed within the first sweetener particles; (b) second sweetener particles predominantly containing, or consisting essentially of, ordinary sugar; (c) at least one fat; and (d) optionally, at least one starch; wherein a total concentration of the first sweetener, the second sweetener, the at least one fat, and the at least one starch, within the food formulation, is at least 20%, on a weight basis; and wherein the predominant sweetener within the food formulation is the ordinary sugar.

According to features in the described preferred embodiments, the food formulation exhibits improved sweetness with respect to a control edible formulation that is identical to the food formulation, but devoid of the at least one protein.

Further aspects and features of the invention are provided hereinbelow.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only.

In the Drawings.

DESCRIPTION OF THE PREFERRED EMBODIMENTS

Figure 1:
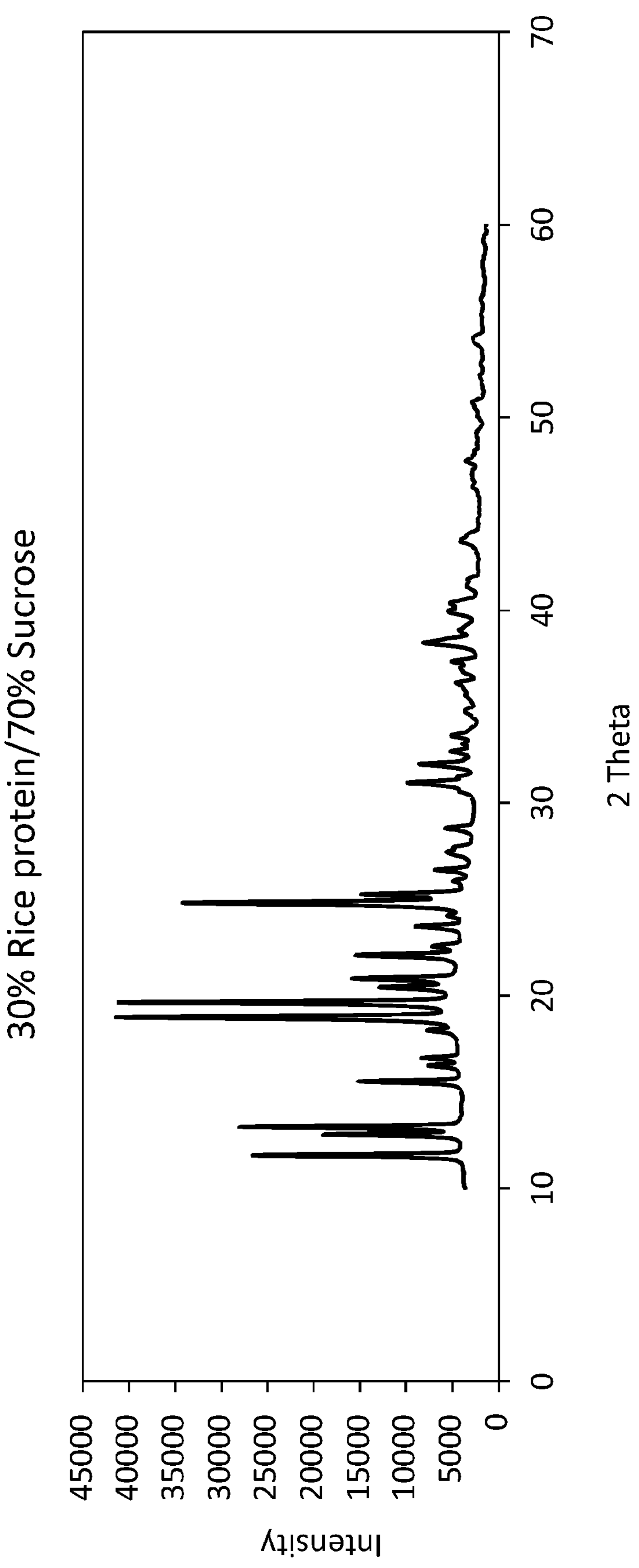
FIG. 1 is an X-ray diffraction (XRD) plot of a solid sweetener concentrate formulation containing 30% rice protein and 70% sucrose, according to an aspect of the present invention.

The present disclosure primarily describes sweetener concentrate formulations containing one or more proteins disposed in the sweetener particles, and edible formulations containing such sweetener concentrate formulations.

Such sweetener concentrate formulations include one or more species of protein that may exhibit any of various mucoadhesive properties.

The inventors have found that the addition of various proteins to food may—disadvantageously—reduce the perceived sweetness of the food. Without wishing to be bound by theory, the inventors believe that this may be due, at least in part, to the contribution of such proteins to food astringency. Consequently, an additional quantity of sweetener (e.g., sucrose or fructose) may need to be introduced to a food to offset the deleterious influence of the protein on food sweetness, food taste, food mouthfeel, etc. This, in turn, may compromise or change various food properties, including textural and baking properties, such that formulation of the food and preparation thereof may require appreciable modification. With specific regard now to milk proteins, this phenomenon may be more severe for whey protein isolate relative to whey protein concentrate. This phenomenon may be yet more severe for casein-based proteins relative to the various whey protein formulations. In particular, casein-based proteins may deleteriously impact mouthfeel.

Various vegetable protein concentrates may also compromise various food taste properties. Pea proteins, by way of example, may contribute to unpleasant sensory perceptions, e.g., astringency.

The inventors have further discovered that the location of the protein within the food may be of cardinal importance, at least with respect to the sweetness thereof. Specifically, the inventors have discovered when the protein is incorporated within the sweetener particles, the protein may not negatively impact food sweetness. In fact, the inventors have surprisingly discovered that under certain conditions (e.g., within a particular concentration range of the proteins), the presence of such proteins within the food may actually enhance food sweetness.

Without wishing to be limited by theory, the inventors believe that mucoadhesion of the protein to the mucosa or mucous membranes on the tongue and within the oral cavity may contribute to the retention of sweetener carbohydrates and sweetener polyols, resulting in an enhanced and extended sensation of sweetness. This phenomenon occurs, or is greatly enhanced, when the protein is incorporated within the sweetener particles, such that the mucosal adhesion between the mucin-containing mucosa and the protein in the sweetener particle helps to fix the sweetener particle to the oral mucosa, or to at least increase the contact time between the sweetener particle to the oral mucosa. This translates into increased activation of the sweetness sensors/receptor sites on the tongue, by way of example.

The inventors have further surprisingly discovered that within a particular, low range of concentrations of proteins disposed within the sweetener particles, the presence of the proteins (possibly due to increased mucosal adhesion) appears to more than offset various properties of proteins that deleteriously affect taste, including perceived sweetness. These deleterious properties include the increased viscosity of the food (inter alia, reducing the solubility kinetics and hindering the transport of sweetener molecules to the sweetness sensors/receptor sites), covering and blocking oral sweetness sensors/receptor sites, and the non-sweet taste of the proteins. By more than offsetting these deleterious properties, the presence of the proteins within the sweetener particles may impart appreciably enhanced sweetness to the food.

However, the inventors have surprisingly discovered that above this particular, low range of concentrations of proteins disposed within the sweetener particles (e.g., a sweetener formulation containing protein disposed within sugar particles in a weight ratio of 20% protein to 80% sugar), the presence of the protein may appreciably detract from perceived sweetness. Indeed, the perceived sweetness of such protein-containing sweetener particle formulations may be significantly reduced with respect to a control sweetener formulation that is identical to the sweet formulation, but devoid of the at least one protein.

This having been said, the inventors have discovered that in the presence of other sweetener particles such as ordinary sugar, such sweetness-compromised "protein concentrates" may actually enhance the perceived sweetness. For example, when the protein concentrate, "diluted" with ordinary sugar, is utilized within a food product such as a confection or sweet baked goods (cakes, cookies, pastries, and the like), this food product may exhibit appreciably improved sweetness with respect to a control food product having the identical concentration of sweetener (in this example: ordinary sugar), but devoid of the protein.

In some cases, the inventive food product may be formulated to contain at least 20% to 50% less sweetener than an actual conventional food product, with no reduction in perceived sweetness.

In addition to the manifest health benefits, the use of sweetness-compromised protein concentrates in conjunction with ordinary sweeteners such as ordinary, crystalline sugar may lead to appreciably reduced production costs for the various food products, with respect to protein-based sweeteners in which essentially all of the sugar particles contain protein at low concentration.

Examples of proteins for use in the formulations of the present invention include, but are not limited to, milk proteins such as caseins and whey proteins. The caseins may include, by way of example, calcium caseinate, sodium caseinate, micellar casein, and acid casein.

Additional examples of such proteins include vegetable proteins. Common examples of such vegetable proteins include rice, pea, and chickpea proteins.

Various proteins may be produced by fermentation.

As used herein in the specification and in the claims section that follows, the term "mucoadhesive agent" and the like refers to a substance exhibiting an affinity for attaching to a mucin layer of a mucosal surface of a human tongue, via mucoadhesion. As used herein, the term "sweetener carbohydrate" refers to an edible sweetener having at least one carbohydrate moiety, which carbohydrate is processed within the human body to produce energy. This definition is meant to include sweetener carbohydrates having an energy value of at least 0.1 kcal/g, more typically, at least 0.2 kcal/g, more typically, at least 0.5 kcal/g, and yet more typically, at least 1.0 kcal/g. This definition is specifically meant to include allulose.

The term "sweetener carbohydrate" is specifically meant to exclude high-intensity sweeteners such as sucralose, aspartame, and acesulfame-K.

The term "sweetener", when used alone, is meant to include both sweetener carbohydrates and sweetener polyols.

A sweetener carbohydrate produces a sweet taste when consumed by the typical human consumer. If, on a normalized sweetness scale, on a weight basis, in which sucrose is taken as a standard of 1, maltose is about 0.31, and lactose is about 0.22, the term "sweetener carbohydrate" would apply to lactose, and to any sugar or other nutritive, carbohydrate-containing sweetener having a sweetness within a range of 0.15 to 2.5 on this normalized sweetness scale. Alternatively, it may be stated that the minimum sweetness for the sugar or other nutritive, carbohydrate-containing sweetener would be that of raffinose (which has a sweetness of 0.15 on the above-mentioned scale). More typically, such a sweetener carbohydrate has a sweetness within a range of 0.25 to 2.5, 0.35 to 2.5, 0.45 to 2.5, 0.25 to 1.8, 0.45 to 1.7, 0.15 to 1.7, or 0.35 to 1.5 on this normalized sweetness scale.

It is noted that the relative sweetness of fructose reported in the literature has been reported to be as little as 0.91, and as much as about 1.7. For the avoidance of doubt, the term "sweetener carbohydrate" is meant to include fructose, irrespective of any of its reported relative sweetness values.

As used herein, the term "normalized sweetness scale", refers to a relative sweetness scale, on a weight basis, in which sucrose is assigned a value of 1.00. More specifically, the normalized sweetness scale is determined according to the methods disclosed in Moscowitz, H. "Ratio Scales of Sugar Sweetness"; Perception & Psychophysics, 1970, Vol. 7 (5), in which the power function for the sugars and polyols/sugar alcohols has an exponent of 1.3 (n=1.3), as disclosed therein in Table 3, and as provided hereinbelow.

From "Ratio Scales of Sugar Sweetness" (Table 3)

| | Percent by Weight Basis | |
|---|---|---|
| | Rank | Relative Sweetness |
| Sucrose | 1 | 1.00 |
| Fructose | 2 | 0.91 |
| Raffinose | 15 | 0.15 |
| Maltose | 12 | 0.31 |
| Lactose | 14 | 0.22 |
| Dulcitol | 5 | 0.46 |

-continued

| From "Ratio Scales of Sugar Sweetness" (Table 3) | | |
|---|---|---|
| | Percent by Weight Basis | |
| | Rank | Relative Sweetness |
| Glucose | 4 | 0.45 |
| Galactose | 6 | 0.42 |
| Sorbose | 7 | 0.41 |
| Sorbitol | 9 | 0.37 |
| Mannitol | 11 | 0.33 |
| Arabinose | 8 | 0.39 |
| Rhamnose | 10 | 0.35 |
| Glycerol | 3 | 0.50 |
| Xylose | 13 | 0.26 |

A sweetener carbohydrate may be a monosaccharide or a disaccharide. Examples of sweetener carbohydrates include, but are not limited to, sucrose, glucose, maltose, fructose, lactose, or any combination of sweetener carbohydrates. One or more sweetener carbohydrate may be combined with one or more sweetener polyols. A sweetener carbohydrate may be naturally occurring or synthetically produced.

As used herein, the term "sweetener polyol" refers to a consumable polyol that produces a sweet taste when consumed by the typical human consumer. Non-limiting examples of sweetener polyols include xylitol, maltitol, erythritol, sorbitol, threitol, arabitol, hydrogenated starch hydrolyzates (HSH), isomalt, lactitol, mannitol, or galactitol (dulcitol). In many instances, the polyol is a sugar alcohol. A sugar alcohol can be produced from a carbohydrate by any known method of reduction (via a chemical or biological transformation) of an acid or aldehyde to an alcohol. In other cases, a sweetener polyol can be synthesized from a parent carbohydrate. Alternatively, a sweetener polyol may be obtained from a biological source.

For the avoidance of doubt, the term "sweetener polyol" is meant to include any polyol/sugar alcohol having a sweetness within a range of 0.15 to 2.5 on the above-described normalized sweetness scale. More typically, such a sweetener polyol has a sweetness within a range of 0.15 to 1.5, 0.15 to 1.0, 0.15 to 0.8, 0.15 to 0.7, 0.20 to 0.7, 0.15 to 0.6, or 0.25 to 0.6, on this normalized sweetness scale.

The proteins for use in accordance with the formulations and methods of the present invention may have various mucoadhesive properties.

Mucoadhesion may generally refer to the attachment of particular macromolecules to a mucin layer of a mucosal surface of a human tongue. The mucoadhesive agent's affinity for attaching to a mucin layer of a mucosal surface of a human tongue may be characterized or quantified by various characterization methods.

As used herein in the specification and in the claims section that follows, the terms "mucoadhesion" and "mucosal adhesion" refer to the tendency of a formulation, or of particular macromolecules (e.g., various proteins) to attach to a mucin layer of a mucosal surface of a human tongue.

As used herein in the specification and in the claims section that follows, the term "mucoadhesive agent" and the like refers to a substance exhibiting an affinity for attaching to a mucin layer of a mucosal surface of a human tongue, via mucoadhesion.

The mucoadhesive properties of the proteins for use in accordance with the formulations and methods of the present invention may have numerous hydrophilic groups, such as amine groups, methoxy groups, hydroxyl groups, etc., which may aid the attachment to mucus or cell membranes through various interactions such as hydrogen bonding and electrostatic interactions. Mucoadhesion may be promoted by various physical phenomena, including entanglement.

With respect to whey proteins, by way of example, appreciable electrostatic interactions may occur between positively charged whey proteins (e.g., beta lactoglobulin) and negatively charged saliva proteins.

In some embodiments of the invention, the protein is, or includes, a globular protein.

In some embodiments of the invention, the protein is, or includes, a storage protein.

In some embodiments of the invention, the globular protein is, or includes, a globulin protein.

In some embodiments of the invention, the globular protein is, or includes, an albumin protein.

In some embodiments of the invention, the storage protein is, or includes, a seed storage protein.

In some embodiments of the invention, the storage protein is, or includes, a prolamin protein.

In some embodiments of the invention, the prolamin protein is, or includes, a glutelin protein.

In some embodiments of the invention, the storage protein is, or includes, 2S albumin protein.

In some embodiments of the invention, the globulin protein is, or includes, 7S vicilin protein.

In some embodiments of the invention, the globulin protein is, or includes, 11S legumin protein.

In some embodiments of the invention, the globulin protein is, or includes, 15S globulin protein.

In some embodiments of the invention, the globulin protein is, or includes, 8S convicilin protein.

In some embodiments of the invention, the globulin protein is, or includes, γ-conglutin protein.

In some embodiments of the invention, the globulin protein is, or includes, β-conglutin protein.

In some embodiments of the invention, the storage protein is, or includes an ovalbumin protein.

In some embodiments of the invention, the storage protein is, or includes, a beta-lactoglobulin protein.

In some embodiments of the invention, the storage protein is, or includes, a serum albumin such as bovine serum albumin.

In some embodiments of the invention, the protein is a milk protein.

In some embodiments, the milk protein includes at least one whey protein.

There are several common types of whey protein, including whey protein concentrate and whey protein isolate. Whey protein concentrate (WPC) typically contains 70% to 80% protein. WPC additionally contains lactose and fats. Whey protein isolate (WPI) contains at least 90% protein, and may contain lactose and fats, but in smaller quantities than WPC.

In some embodiments, the milk protein includes at least one casein.

In some embodiments, the at least one whey is in the form of a whey concentrate.

In some embodiments, the at least one whey is in the form of a whey protein isolate.

In some embodiments, the at least one whey protein is in the form of any combination of whey concentrate and whey protein isolate.

In some embodiments, the milk protein (e.g., whey protein) includes an α-lactalbumin.

In some embodiments, the milk protein (e.g., whey protein) includes a β-lactoglobulin.

In some embodiments, the milk protein (e.g., whey protein) includes a serum albumin.

In some embodiments, the milk protein (e.g., whey protein) includes at least one immunoglobulin.

In some embodiments, the milk protein (e.g., whey protein) includes at least one proteose peptone.

In some embodiments, the at least one casein is a caseinate.

In some embodiments, the at least one casein includes a caseinate.

In some embodiments, the casein is a metal caseinate.

In some embodiments, the caseinate has a form of $R^{+1}$-caseinate, wherein R has a nominal valence of 1, e.g., potassium caseinate.

In some embodiments, the caseinate has a form of $R^{+2}$-(caseinate)$_2$, wherein R has a nominal valence of 2, e.g., magnesium caseinate.

In some embodiments, the caseinate has a form of $R^{+}3$-(caseinate)$_3$, wherein R has a nominal valence of 3, e.g., chromium caseinate.

In some embodiments, the casein is calcium caseinate.

In some embodiments, the casein is selected from the group of caseinates consisting of calcium caseinate, magnesium caseinate, sodium caseinate, potassium caseinate, ammonium caseinate, and chromium caseinate.

In some embodiments, the casein is an acid casein.

In some embodiments, the casein (e.g., calcium caseinate) is in the form of micelles.

In some embodiments of the invention, the protein includes at least one vegetable protein.

In some embodiments, the at least one vegetable protein is in the form of any combination of vegetable protein concentrate and vegetable protein isolate.

In some embodiments, the vegetable protein includes rice protein.

In some embodiments, the vegetable protein includes pea protein.

In some embodiments, the vegetable protein includes chickpea protein.

In some embodiments of the invention, the egg protein includes or mainly includes an albumin.

In some embodiments of the invention, the albumin includes or mainly includes ovalbumin.

In some embodiments of the invention, the egg protein includes or mainly includes a lipoprotein.

In some embodiments of the invention, the lipoprotein includes or mainly includes a low density lipoprotein.

In some embodiments of the invention, the lipoprotein includes a high density lipoprotein.

In some embodiments, the at least one egg protein is in the form of any one or any combination of egg protein, egg protein concentrate and egg protein isolate.

Typically, an edible filler material is utilized to make up the reduced amount of sugar in the food formulations of the present invention. Typically, the edible filler may be a dietary fiber or soluble fiber such as a soluble dietary fiber.

In some embodiments, the edible filler may be, or include, a polysaccharide, such as a fructan. Of the fructans, inulin may typically be used.

In some embodiments, the edible filler may be, or include, an oligosaccharide, such as a fructooligosaccharide.

In some embodiments, the soluble fiber may be, or include, resistant maltodextrin, e.g., soluble corn fiber.

In some embodiments, the soluble fiber may be, or include, polydextrose.

The sweetener formulation or edible formulation is typically devoid of silicon-containing species such as silica. In some embodiments, the concentration of silicon within the sweetener formulation or edible formulation is at most 1%, at most 0.5%, at most 0.2%, at most 0.1%, at most 0.05%, at most 0.02%, at most 0.01%, at most 0.005%, or at most 0.003%. Typically, the concentration of silicon within the sweetener formulation or edible formulation is at most 0.002%, at most 0.001%, or the formulation is devoid of silicon.

EXAMPLES

Reference is now made to the following examples, which together with the above descriptions, illustrate the invention in a non-limiting fashion.

EQUIPMENT

| Instruments | Manufacturer | Model | Measuring range | Units | Geometry |
|---|---|---|---|---|---|
| High shear mixer | IKA | IKA T 25 ULTRA-TURRAX ® | 3000-25000 | rpm | |
| | Silverson | L5M-A | 0-8000 | rpm | |
| Vacuum mixer-dryer (cooking mixer) | Stephan | UMC 5 | 300-3000 | 1/min | |
| Vacuum pump | Vacuubrand | MZ 2C NT | 50 | Hz | |
| Laboratory oven | MRC Ltd | DFO-150 | 25-250 | ° C. | |
| Ultra centrifugal mill | Retsch | ZM200 | 50 | Hz | |
| Refractometer | Schmidt + Haensch | VariRef A | 0.00-100 Bx | % | |
| Texture analyzer | Stable Micro Systems | TA.XTplus | 0-5000 | gr | A/MUC Muco-adhesion Test Rig |
| Rheometer | Anton Paar GmbH | MCR 92 P/N: 159000 | 0-1000 | 1/s | Bob-cup cylinder |

| MATERIALS | | |
|---|---|---|
| Material | Manufacturer | Type |
| Calcium caseinate (Ca-Caseinate, CaC) | Fonterra | 380 |
| | Cambridge commodities | P0303 |
| | Bulk Nutrients | Ca-caseinate |
| | Friesland campina ingredients | Excellion ® Calcium caseinate I |
| Micellar casein | Idapro | MC88 |
| | Agrocomplex | Micellar casein 85 |
| | Milk specialities | Instant Micellar Casein - Low Grit Non-GMO |
| Rice protein | LSP, zero | LSP, Zero |
| | ET-chem Natural ingredients | |
| | Milk specialities | PROriz80 ™ |
| | Axiomfoods | Oryzatein |
| Pea protein | Roquette | Nutralys |
| | Pangea | |
| | AGT Food and Ingredients | FYPP-85-C |
| | Axiomfoods | VegOtein P ™ |
| Mung bean | Harbin hada Starch Co., Ltd. | H-Protein 008 |
| | ET-chem Natural ingredients | |
| Lentil | AGT Food and Ingredients | FYLP-55-D |
| Faba bean | AGT Food and Ingredients | FYBP-90-C |
| Potato | Avebe | Solanic 200 |
| | Bioriginals | SOLATHIN |
| Zein | A.F.Suter | |
| | FloZein Products | FloZein |
| Hemp | Axiomfoods | Cannatein ® |
| | Bioriginals | |
| Lupin | ProLupin | 10600 |
| | Lup' Ingredient | PROTILUP |
| Soy protein | Axiomfoods | Oryzatein ® SG-BN |
| Chickpea | Chick.P | G910 |
| | | G930 |
| | Artesa | |
| Pumpkin protein | Axiomfoods | Cucurbotein ® |
| Protein source by fermentation | Perfect Day | Beta-lactoglobulin |
| Sodium caseinate | Fonterra | 180 |
| (Na-caseinate, NaC) | Friesland campina ingredients | Excellion ® Sodium caseinate S |
| | Armor proteins | Extruded sodium caseinates |
| Magnesium caseinate | Friesland campina ingredients | Excellion ® Magnesium caseinate S |
| | EPI Ingredients | 880 |
| | Tatua | Magnesium caseinate |
| Potassium caseinate | Scott Laboratories | Potassium caseinate |
| | Armor proteins | Spray dries potassium caseinate |
| | Tatua | Potassium caseinate |
| | EPI Ingredients | 710 |
| Ammonium Caseinate | Rose brand products | Ammonia Caseinate |
| | Parchem | Ammonium Caseinate |
| Chromium Caseinate | Parchem | |
| Acid casein | Fonterra | 741 |
| | Armor proteins | Acid casein |
| | Milk food | Acid casein |
| Whey protein isolate | Fonterra | 8855 |
| (WPI) | LSP-nutrition | Zero WPI 90 |
| | Myprotein | Impact Whey Isolate |
| Milk protein concentrate | Fonterra | 4861 |
| Whey protein concentrate (WPC) | Fonterra | 356 |
| Filler -- Inulin | Beneo | Orafti High Soluble Inulin |
| | Cosucra | Fibruline |
| | Sensus | Frutafit CLR |
| Filler -- Fructooligosaccharide | Gofos ™ | Galam |

Various common materials (sugars, polyols, etc.) have not been included in this list.

Example 1

Production of a Protein-Sweetener Slurry

A sweetener syrup containing one or more carbohydrate sweeteners and/or one or more polyol (typically sugar alcohol) sweeteners, is prepared prior to the addition of the protein. The temperature of the sweetener syrup is generally maintained within a range of 25° C. to as much as 80° C., in some cases. For sucrose, the default temperature is 60° C. Various proteins may be temperature-sensitive, and may dictate the maximum temperature for the preparation procedure. The concentration of sweetener, with respect to water, is typically within a range of 1 wt %-65 wt % (may depend on the ratio between the protein and the sweetener) for most of the carbohydrate and polyol sweeteners. Some of the lower solubility sweeteners may require relatively high water concentrations and/or temperatures in order to fully dissolve. The protein is then added incrementally under constant mixing. Once the protein addition has been completed, the mixing vessel continues to be stirred for at least 7 minutes using a high shear mixer, until the protein is fully dispersed within the sweetener syrup.

For proteins that are more difficult to disperse, the water fraction may be pre-heated.

Example 2

Production of a Dry Powder

Protein-sweetener concentrate syrup (e.g., produced according to Example 1) is transferred to the heated double-jacketed vessel of the vacuum dryer (e.g., Stephan). The vessel is heated (typically to 60° C.-70° C.), maintained under vacuum, and mixed constantly, so as to evaporate the water, eventually producing a protein-sweetener concentrate powder that is typically fine and dry.

Optionally, the powder may be transferred to an oven (typically operating at 65° C.) for further drying for several hours or overnight.

Example 2A

Size Reduction of the Protein-Sweetener Powder

The protein-sweetener concentrate, typically in powder form, may optionally undergo size reduction. The protein-sweetener powder may be milled to produce a fine powder having a D50 that is typically within the range of 75 to 300 micrometers, depending on the particular protein(s) in the concentrate.

Example 3

Dilution of the Protein-Sweetener Concentrate to Produce a Sweetener Ingredient

The protein-sweetener concentrate, typically having a D50 within a range of 75 to 300 micrometers (e.g., having undergone size reduction as in Example 2A), is diluted with at least one ordinary carbohydrate sweetener and/or at least one polyol (typically a sugar alcohol) sweetener to yield the desired amount of protein in the sweetener formulation. For example: in order to prepare a "diluted" protein-sweetener formulation or "regular-strength protein-sweetener" formulation containing an average of 0.3% protein, from a protein-sweetener concentrate containing 50% protein; 0.6 grams of the protein-sweetener concentrate formulation is mixed with 99.4 grams of the ordinary carbohydrate sweeteners (e.g., sucrose) and/or polyol sweetener.

Example 4

Utilization of the Sweetener Ingredient in the Production of an Edible Formulation The "diluted" or "regular-strength" protein-sweetener formulation (e.g., as produced according to Example 3), which may be a mixture of protein-sweetener concentrate and ordinary sweetener, is added as an ingredient, along with other ingredients, and may be mixed and optionally processed further (e.g., baked) to produce an edible formulation (e.g., cake, muffins, biscuits).

Example 5

Another way to utilize the protein-sweetener concentrate formulation is by adding—as separate ingredients—the requisite amount of the protein-sweetener concentrate along with the ordinary sweetener (carbohydrate sweetener and/or polyol sweetener) during the preparation of the edible formulation (e.g., muffins). For example: to obtain, within the edible formulation, a sweetener having an average protein concentration of 0.3% from an ordinary sweetener and a concentrated protein-containing sweetener containing 50% protein, 0.6 grams of the protein-sweetener concentrate is added along with 99.4 grams of the ordinary sweetener. The protein-sweetener concentrate and the ordinary sweetener may thus be added as separate components, and not as a mixture.

Example 6

A dispersion (slurry) containing 50% calcium caseinate formulation (P0303, Cambridge commodities, 88% protein) and 50% sucrose was prepared according to Example 1:100 grams of calcium caseinate formulation were added gradually to a sucrose syrup containing 100 grams sucrose and 500 grams water. The syrup containing the calcium caseinate was then transferred to the heated double-jacketed vessel of the vacuum dryer, which was heated and maintained under vacuum according to Example 2, to produce a protein-sweetener concentrate as a fine dry powder.

Example 7

A dispersion (slurry) containing 70% calcium caseinate formulation (P0303, Cambridge commodities, 88% protein) and 30% sucrose was prepared according to Example 1:100 grams of calcium caseinate formulation were added gradually to sucrose syrup containing 42.8 grams sucrose and 500 grams water. The syrup containing the calcium caseinate was then transferred to the heated double-jacketed vessel of the vacuum dryer, which was heated and maintained under vacuum according to Example 2, to produce a protein-sweetener concentrate as a fine dry powder.

Example 8

A dispersion (slurry) containing 10% calcium caseinate formulation (P0303, Cambridge commodities, 88% protein) and 90% sucrose was prepared according to Example 1:100 grams of calcium caseinate formulation were added gradually to sucrose syrup containing 900 grams sucrose and 500 grams water. The syrup containing the calcium caseinate was then transferred to the heated double-jacketed vessel of the vacuum dryer, which was heated and maintained under vacuum according to Example 2, to produce a protein-sweetener concentrate as a fine dry powder.

Example 9

A dispersion (slurry) containing 90% calcium caseinate formulation (P0303, Cambridge commodities, 88% protein) and 10% sucrose was prepared according to Example 1:100 grams of calcium caseinate formulation were added gradually to sucrose syrup containing 11.1 grams sucrose and 500 grams water. The syrup containing the calcium caseinate was then transferred to the heated double-jacketed vessel of the vacuum dryer, which was heated and maintained under vacuum according to Example 2, to produce a protein-sweetener concentrate as a fine dry powder.

Example 10

A dispersion (slurry) containing 30% calcium caseinate formulation (P0303, Cambridge commodities, 88% protein)

and 70% sucrose was prepared according to Example 1:100 grams of calcium caseinate formulation were added gradually to sucrose syrup containing 233.3 grams sucrose and 500 grams water. The syrup containing the calcium caseinate was then transferred to the heated double-jacketed vessel of the vacuum dryer, which was heated and maintained under vacuum according to Example 2, to produce a protein-sweetener concentrate as a fine dry powder.

Example 11

A dispersion (slurry) containing 30% rice protein formulation (Zero, LSP, 79% protein) and 70% sucrose was prepared according to Example 1:100 grams of rice protein formulation were added gradually to sucrose syrup containing 233.3 grams sucrose and 500 grams water. The syrup containing the rice protein was then transferred to the heated double-jacketed vessel of the vacuum dryer, which was heated and maintained under vacuum according to Example 2, to produce a protein-sweetener concentrate as a fine dry powder.

Example 12

A dispersion (slurry) containing 50% rice protein formulation (Zero, LSP, 79% protein) and 50% sucrose was prepared according to Example 1:100 grams of rice protein formulation were added gradually to sucrose syrup containing 100 grams sucrose and 500 grams water. The syrup containing the rice protein was then transferred to the heated double-jacketed vessel of the vacuum dryer, which was heated and maintained under vacuum according to Example 2, to produce a protein-sweetener concentrate as a fine dry powder.

Example 13

A dispersion (slurry) containing 70% rice protein formulation (Zero, LSP, 79% protein) and 30% sucrose was prepared according to Example 1:100 grams of rice protein formulation were added gradually to sucrose syrup containing 42.8 grams sucrose and 500 grams water. The syrup containing the rice protein was then transferred to the heated double-jacketed vessel of the vacuum dryer, which was heated and maintained under vacuum according to Example 2, to produce a protein-sweetener concentrate as a fine dry powder.

Example 14

A dispersion containing 1% calcium caseinate formulation (P0303, Cambridge commodities, 88% protein) was prepared according to Example 1: a concentrated sweetener syrup containing 650 grams sucrose was prepared prior to the addition of the calcium caseinate. 6.5 grams of calcium caseinate were then dispersed in the concentrated sweetener syrup. The syrup was transferred to the heated double-jacketed vessel of the vacuum dryer, which was heated and maintained under vacuum according to Example 2, to produce a protein-sweetener concentrate as a fine dry powder.

Example 15

A dispersion containing 1.5% calcium caseinate formulation (P0303, Cambridge commodities, 88% protein) was prepared according to Example 1: a concentrated sweetener syrup containing 650 grams sucrose was prepared prior to the addition of the calcium caseinate formulation. 9.75 grams of calcium caseinate formulation were then dispersed in the concentrated sweetener syrup. The syrup was transferred to the heated double-jacketed vessel of the vacuum dryer, which was heated and maintained under vacuum according to Example 2, to produce a protein-sweetener concentrate as a fine dry powder.

Example 16

A dispersion containing 1% rice protein formulation (Zero, LSP, 79% protein) was prepared according to Example 1: a concentrated sweetener syrup containing 650 grams sucrose was prepared prior to the addition of the rice protein formulation. 6.5 grams of rice protein formulation were then dispersed in the concentrated sweetener syrup. The syrup was transferred to the heated double-jacketed vessel of the vacuum dryer, which was heated and maintained under vacuum according to Example 2, to produce a protein-sweetener concentrate as a fine dry powder.

Examples 17-26

The formulations of Examples 6 to 15 were prepared, but using fructose instead of sucrose.

Example 27

A dispersion (slurry) containing 70% pea protein isolate (Nutralys® S85XF, 83-88% protein) and 30% sucrose was prepared according to Example 1:100 grams of pea protein isolate were added gradually to sucrose syrup containing 42.8 grams sucrose and 500 grams water. The syrup containing the pea protein was then transferred to the heated double-jacketed vessel of the vacuum dryer, which was heated and maintained under vacuum according to Example 2, to produce a protein-sweetener concentrate as a fine dry powder.

Example 28

A dispersion (slurry) containing 60% pea protein isolate (Nutralys® S85XF, 83-88% protein) and 40% sucrose was prepared according to Example 1:100 grams of pea protein isolate were added gradually to sucrose syrup containing 66.6 grams sucrose and 500 grams water. The syrup containing the pea protein was then transferred to the heated double-jacketed vessel of the vacuum dryer, which was heated and maintained under vacuum according to Example 2, to produce a protein-sweetener concentrate as a fine dry powder.

Example 29

A dispersion (slurry) containing 20% pea protein isolate (Nutralys® S85XF, 83-88% protein) and 80% sucrose was prepared according to Example 1:100 grams of pea protein isolate were added gradually to sucrose syrup containing 400 grams sucrose and 500 grams water. The syrup containing the pea protein was then transferred to the heated double-jacketed vessel of the vacuum dryer, which was heated and maintained under vacuum according to Example 2, to produce a protein-sweetener concentrate as a fine dry powder.

Example 30

A dispersion (slurry) containing 50% pea protein isolate (Nutralys® S85XF, 83-88% protein) and 50% sucrose was prepared according to Example 1:100 grams of pea protein isolate were added gradually to sucrose syrup containing 100 grams sucrose and 500 grams water. The syrup containing the pea protein was then transferred to the heated double-jacketed vessel of the vacuum dryer, which was heated and maintained under vacuum according to Example 2, to produce a protein-sweetener concentrate as a fine dry powder.

Example 31

A dispersion (slurry) containing 50% micellar casein formulation (IdaPro, 88% protein) and 50% sucrose was prepared according to Example 1:100 grams of micellar casein formulation were added gradually to sucrose syrup containing 100 grams sucrose and 500 grams water. The syrup containing the micellar casein was then transferred to the heated double-jacketed vessel of the vacuum dryer, which was heated and maintained under vacuum according to Example 2, to produce a protein-sweetener concentrate as a fine dry powder.

Example 32

A dispersion (slurry) containing 70% micellar casein formulation (IdaPro, 88% protein) and 30% sucrose was prepared according to Example 1:100 grams of micellar casein formulation were added gradually to sucrose syrup containing 42.86 grams sucrose and 500 grams water. The syrup containing the micellar casein was then transferred to the heated double-jacketed vessel of the vacuum dryer, which was heated and maintained under vacuum according to Example 2, to produce a protein-sweetener concentrate as a fine dry powder.

Example 33

A dispersion (slurry) containing 30% micellar casein formulation (IdaPro, 88% protein) and 70% sucrose was prepared according to Example 1:100 grams of micellar casein formulation were added gradually to sucrose syrup containing 233.3 grams sucrose and 500 grams water. The syrup containing the micellar casein was then transferred to the heated double-jacketed vessel of the vacuum dryer, which was heated and maintained under vacuum according to Example 2, to produce a protein-sweetener concentrate as a fine dry powder.

Example 34

A dispersion (slurry) containing 90% micellar casein formulation (IdaPro, 88% protein) and 10% sucrose was prepared according to Example 1:100 grams of micellar casein formulation were added gradually to sucrose syrup containing 11.1 grams sucrose and 500 grams water. The syrup containing the micellar casein was then transferred to the heated double-jacketed vessel of the vacuum dryer, which was heated and maintained under vacuum according to Example 2, to produce a protein-sweetener concentrate as a fine dry powder.

Example 35

A protein-sweetener concentrate was produced by processing the formulation of Example 13 according to Example 1, and subsequently heating under vacuum according to Example 2, to produce a protein-sweetener concentrate as a fine dry powder. The powder was subjected to size reduction according to Example 2A.

The milled protein-sweetener concentrate powder was then mixed with ordinary sugar according to Example 3:0.145 grams of the powder were mixed with 79.855 grams of sucrose to yield 80 grams of the final sweetener formulation, which contained an average actual rice protein concentration of 0.1%, which corresponds to an average nominal rice protein concentration of 0.127%.

Example 36

A protein-sweetener concentrate was produced by processing the formulation of Example 32 according to Example 1, and subsequently evaporating under vacuum according to Example 2, to produce a protein-sweetener concentrate as a fine dry powder. The powder was subjected to size reduction according to Example 2A.

The protein-sweetener concentrate powder was then mixed with ordinary sugar according to Example 3:0.13 grams of the powder was mixed with 79.87 grams of sucrose to yield 80 grams of the final sweetener formulation, which contained an average actual micellar casein protein concentration of 0.1%, which corresponds to an average nominal micellar casein protein concentration of 0.114%.

Example 37

A protein-sweetener concentrate was produced by processing the formulation of Example 7 according to Example 1, and subsequently evaporating under vacuum according to Example 2, to produce a protein-sweetener concentrate as a fine dry powder. The powder was subjected to size reduction according to Example 2A.

The protein-sweetener concentrate powder was then mixed with ordinary sugar according to Example 3:0.162 grams of the powder was mixed with 99.84 grams of sucrose to yield 100 grams of the final sweetener formulation, which contained an average actual calcium caseinate concentration of 0.1%.

Example 38

A protein-sweetener concentrate was produced by processing the formulation of Example 10 according to Example 1, and subsequently evaporating under vacuum according to Example 2, to produce a protein-sweetener concentrate as a fine dry powder. The powder was subjected to size reduction according to Example 2A.

The protein-sweetener concentrate powder was then mixed with ordinary sugar according to Example 3:0.379 grams of the powder was mixed with 99.62 grams of sucrose to yield 100 grams of the final sweetener formulation, which contained an average actual calcium caseinate concentration of 0.1%.

Example 39

A protein-sweetener concentrate was produced by processing the formulation of Example 6 according to Example 1, and subsequently evaporating under vacuum according to Example 2, to produce a protein-sweetener concentrate as a fine dry powder. The powder was subjected to size reduction according to Example 2A.

The protein-sweetener concentrate powder was then mixed with ordinary sugar according to Example 3:0.227 grams of the powder was mixed with 99.772 grams of sucrose to yield 100 grams of the final sweetener formulation, which contained an average actual calcium caseinate concentration of 0.1%.

Example 40

A protein-sweetener concentrate was produced by processing the formulation of Example 6 according to Example 1, and subsequently evaporating under vacuum according to Example 2, to produce a protein-sweetener concentrate as a fine dry powder. The powder was subjected to size reduction according to Example 2A.

The protein-sweetener concentrate powder was then mixed with ordinary sugar according to Example 3:1.136 grams of the powder was mixed with 98.863 grams of sucrose to yield 100 grams of the final sweetener formulation, which contained an average actual calcium caseinate concentration of 0.5%.

Example 41

A protein-sweetener concentrate was produced by processing the formulation of Example 31 according to Example 1, and subsequently evaporating under vacuum according to Example 2, to produce a protein-sweetener concentrate as a fine dry powder. The powder was subjected to size reduction according to Example 2A.

The protein-sweetener concentrate powder was then mixed with ordinary sugar according to Example 3:0.227 grams of the powder was mixed with 99.772 grams of sucrose to yield 100 grams of the final sweetener formulation, which contained an average actual micellar casein concentration of 0.1%.

Example 42

A protein-sweetener concentrate was produced by processing the formulation of Example 11 according to Example 1, and subsequently evaporating under vacuum according to Example 2, to produce a protein-sweetener concentrate as a fine dry powder. The powder was subjected to size reduction according to Example 2A.

The protein-sweetener concentrate powder was then mixed with ordinary sugar according to Example 3:0.422 grams of the powder was mixed with 99.578 grams of sucrose to yield 100 grams of the final sweetener formulation, which contained an average actual rice protein concentration of 0.1%.

Example 43

A protein-sweetener concentrate was produced by processing the formulation of Example 12 according to Example 1, and subsequently evaporating under vacuum according to Example 2, to produce a protein-sweetener concentrate as a fine dry powder. The powder was subjected to size reduction according to Example 2A.

The protein-sweetener concentrate powder was then mixed with ordinary sugar according to Example 3:0.253 grams of the powder was mixed with 99.746 grams of sucrose to yield 100 grams of the final sweetener formulation, which contained an average actual rice protein concentration of 0.1%.

Example 44

A protein-sweetener concentrate was produced by processing the formulation of Example 13 according to Example 1, and subsequently evaporating under vacuum according to Example 2, to produce a protein-sweetener concentrate as a fine dry powder. The powder was subjected to size reduction according to Example 2A.

The protein-sweetener concentrate powder was then mixed with ordinary sugar according to Example 3:0.904 grams of the powder was mixed with 99.095 grams of sucrose to yield 100 grams of the final sweetener formulation, which contained an average actual rice protein concentration of 0.5%.

Example 45

A dispersion (slurry) containing 30% calcium caseinate formulation (P0303, Cambridge commodities, 88% protein) and 70% allulose was prepared according to Example 1:51.5 grams of calcium caseinate were added gradually to an allulose syrup containing 120 grams allulose and 480 grams water. The syrup containing the calcium caseinate was then transferred to the heated double-jacketed vessel of the vacuum dryer, which was heated and maintained under vacuum according to Example 2, to produce a protein-sweetener concentrate as a fine dry powder.

Example 46

A dispersion (slurry) containing 50% micellar casein formulation (IdaPro, 88% protein) and 50% allulose was prepared according to Example 1:100 grams of micellar casein were added gradually to an allulose syrup containing 100 grams allulose and 500 grams water. The syrup containing the micellar casein was then transferred to the heated double-jacketed vessel of the vacuum dryer, which was heated and maintained under vacuum according to Example 2, to produce a protein-sweetener concentrate as a fine dry powder.

Example 47

A protein-sweetener concentrate was produced by processing the formulation of Example 31 according to Example 1, and subsequently evaporating under vacuum according to Example 2, to produce a protein-sweetener concentrate as a fine dry powder. The powder was subjected to size reduction according to Example 2A.

The protein-sweetener concentrate powder was then mixed with allulose according to Example 3:0.227 grams of the powder was mixed with 99.772 grams of allulose to yield 100 grams of the final sweetener formulation, which contained an average actual micellar casein concentration of 0.1%.

Example 48

A dispersion (slurry) containing 30% mung bean formulation (H-Protein 008, 85% protein) and 70% sucrose was prepared according to Example 1:100 grams of mung bean were added gradually to a sucrose syrup containing 233.3 grams sucrose and 500 grams water. The syrup containing the mung bean was then transferred to the heated double-jacketed vessel of the vacuum dryer, which was heated and maintained under vacuum according to Example 2, to produce a protein-sweetener concentrate as a fine dry powder.

Example 49

A dispersion (slurry) containing 50% mung bean formulation (H-Protein 008, 85% protein) and 50% sucrose was prepared according to Example 1:100 grams of mung bean were added gradually to a sucrose syrup containing 100 grams sucrose and 500 grams water. The syrup containing the mung bean was then transferred to the heated double-jacketed vessel of the vacuum dryer, which was heated and maintained under vacuum according to Example 2, to produce a protein-sweetener concentrate as a fine dry powder.

Example 50

A dispersion (slurry) containing 70% mung bean formulation (H-Protein 008, 85% protein) and 30% sucrose was prepared according to Example 1:100 grams of mung bean were added gradually to a sucrose syrup containing 42.86 grams sucrose and 500 grams water. The syrup containing the mung bean was then transferred to the heated double-jacketed vessel of the vacuum dryer, which was heated and maintained under vacuum according to Example 2, to produce a protein-sweetener concentrate as a fine dry powder.

Examples 51-60

The formulations of Examples 6 to 15 were prepared, but using maltitol instead of sucrose, and using 700 grams water.

Example 60A

A dispersion (slurry) containing 5% egg protein formulation and 95% sucrose was prepared as follows: 10 grams of egg protein (Pulviver, Powder Sport Plus, 99% protein) were added gradually to sucrose syrup containing 190 grams sucrose and 500 grams water. The syrup containing the protein was then transferred to the heated double-jacketed vessel of the vacuum dryer, which was heated and maintained under vacuum according to Example 8, to produce a protein-sweetener concentrate as a fine dry powder.

Example 60B

A protein-sweetener concentrate was produced: the powder of Example 60A was subjected to size reduction according to Example 2A. The protein-sweetener concentrate powder was then mixed with ordinary sugar according to Example 3:3.0 grams of the powder was mixed with 97 grams of sucrose to yield 100 grams of the final sweetener formulation, which contained an average egg protein concentration of 0.15%.

Example 61

A dispersion (slurry) containing 5% rice protein formulation (Zero, LSP, 79% protein) and 95% sucrose was prepared according to Example 1:10 grams of rice protein formulation were added gradually to sucrose syrup containing 190 grams sucrose and 500 grams water. The syrup containing the rice protein was then transferred to the heated double-jacketed vessel of the vacuum dryer, which was heated and maintained under vacuum according to Example 2, to produce a protein-sweetener concentrate as a fine dry powder.

Example 61A

A protein-sweetener concentrate was produced: the powder of Example 61 was subjected to size reduction according to Example 2A. The protein-sweetener concentrate powder was then mixed with ordinary sugar according to Example 3:24.05 grams of the powder was mixed with 75.95 grams of sucrose to yield 100 grams of the final sweetener formulation, which contained an average actual rice protein concentration of 0.95%.

Example 62

A dispersion (slurry) containing 15% rice protein formulation (Zero, LSP, 79% protein) and 85% sucrose was prepared according to Example 1:15 grams of rice protein formulation were added gradually to a sucrose syrup containing 85 grams sucrose and 500 grams water. The syrup containing the rice protein was then transferred to the heated double-jacketed vessel of the vacuum dryer, which was heated and maintained under vacuum according to Example 2, to produce a protein-sweetener concentrate as a fine dry powder.

Example 62A

A protein-sweetener concentrate was produced: the powder of Example 62 was subjected to size reduction according to Example 2A. The protein-sweetener concentrate powder was then mixed with ordinary sugar according to Example 3:2.53 grams of the powder was mixed with 97.468 grams of sucrose to yield 100 grams of the final sweetener formulation, which contained an average actual rice protein concentration of 0.3%.

Example 63

A dispersion (slurry) containing 95% rice protein formulation (Zero, LSP, 79% protein) and 5% sucrose was prepared according to Example 1:95 grams of rice protein formulation were added gradually to sucrose syrup containing 5 grams sucrose and 500 grams water. The syrup containing the rice protein was then transferred to the heated double-jacketed vessel of the vacuum dryer, which was heated and maintained under vacuum according to Example 2, to produce a protein-sweetener concentrate as a fine dry powder.

Example 63A

A protein-sweetener concentrate was produced: the powder of Example 63 was subjected to size reduction according to Example 2A. The protein-sweetener concentrate powder was then mixed with ordinary sugar according to Example 3:0.933 grams of the powder was mixed with 99.067 grams of sucrose to yield 100 grams of the final sweetener formulation, which contained an average actual rice protein concentration of 0.7%.

Examples 64-67

The formulations of Examples 27 to 30 were prepared, but using sorbitol instead of sucrose, and using 700 grams water.

Example 68

Preparation of Muffin Samples

Three types of muffin samples may be prepared. Type I is a "full sugar" control muffin, which may be similar in composition to typical, commercially available muffins. Type II is an inventive, reduced-sugar muffin containing the inventive protein-sweetener or protein-sweetener concentrate. Type III is a reduced sugar control muffin, having the identical composition as the Type II inventive, reduced-sugar muffin, but being devoid of the protein in the sweetener particles.

The batter for each type of muffin contains sugar, 14.2% sunflower oil, 21.8% wheat flour (containing approximately 40% starch), 24.5% eggs, baking powder (1.1%), flavors or flavorants (0.1%), salt (0.1%), and about 16.4% water. The batter of the Type I muffin contains 21.8 wt. % sugar.

A fructooligosaccharide is used as a filler to make up for the reduced amount of sugar in the Type II and Type III samples. Typically, Gofos™ (typically containing 2% sugar) is utilized.

The Type II muffin utilizes a sweetener formulation from various exemplary formulations (many of which are described or exemplified hereinabove). Aside from the formulative differences, the preparation and baking process is identical for the inventive muffin and the control muffins.

Example 68A

Typically, the Type II inventive, reduced-sugar muffin contains 39.1% less sugar with respect to the Type I "full sugar" control muffin. For this exemplary case, the Type II and Type III muffins are formulated such that the batter contains about (100%-39.1%)·21.8%=13.3 wt. % sugar. The fructooligosaccharide (Gofos™) content of the muffin batter is about 8.5 wt % (21.8%-13.38%).

Example 68B

In many cases, the Type II inventive, reduced-sugar muffin may contain reduced sugar in an amount other than the typical reduction of 39.1%. By way of (non-exhaustive) example, the Type II muffin may contain 50% less sugar, 35% less sugar, 20% less sugar, or 10% less sugar. For an exemplary case of 20% less sugar, the Type II muffin is formulated such that the batter contains about (100%-20%)·21.8%=17.44 wt. % sugar, and 4.36 wt. % Gofos™ (21.8%-17.44%). In any event, strictly for comparative purposes, the Type II muffin contains at least 10% less sugar with respect to the Type I "full sugar" control muffin.

Example 69

Preparation of Butter Cookie Samples

Three types of butter cookie samples may be prepared. Type I is a "full sugar" control butter cookie, which may be similar in composition to typical, commercially available butter cookies. Type II is an inventive, reduced-sugar butter cookie containing the inventive protein-sweetener or protein-sweetener concentrate. Type III is a reduced sugar control butter cookie, having the identical composition as the Type II inventive, reduced-sugar butter cookie, but being devoid of the protein in the sweetener particles.

The batter for each type of butter cookie contains sugar, 14.6% palm oil, 49.42% wheat flour (containing approximately 40% starch), corn starch (4.2%), water (5.7%), egg (3.6%), soy lecithin (0.19%), baking powder (0.3%), salt (0.2%), 1.2% invert sugar (containing 5% water), 1.5% heavy cream (containing 37% fat and 3.5% lactose), flavor or flavorants (0.1%), with water being the remainder. The sugar content of the Type I butter cookie is about 19.0%.

Inulin is used as a filler to make up for the reduced amount of sugar in the Type II and Type III samples. Typically, Orafti High Soluble Inulin (which contains 10% sugar) is utilized.

The Type II butter cookie utilizes a sweetener formulation from various exemplary formulations (many of which are described or exemplified hereinabove). Aside from the formulative differences, the preparation and baking process is identical for the inventive butter cookie and the control butter cookies.

Example 69A

Typically, the Type II inventive, reduced-sugar butter cookie contains about 40% less sugar with respect to the Type I "full sugar" control butter cookie. For this exemplary case, the Type II and Type III butter cookies are formulated such that the batter contains about (100%-40.45%)·19.0%=11.3 wt. % sugar. The inulin content of the batter is about 7.7 wt. % (19.0%-11.3%).

Substantially as in the case of the muffin samples provided hereinabove, in many cases, the Type II inventive, reduced-sugar butter cookie may contain reduced sugar in an amount other than the typical reduction of about 40%. By way of (non-exhaustive) example, the Type II butter cookie may contain 50% less sugar, 40% less sugar, 35% less sugar, 20% less sugar, or 10% less sugar. Strictly for comparative purposes, the Type II butter cookie contains at least 10% less sugar with respect to the Type I "full sugar" control butter cookie.

Example 70

Preparation of Hazelnut Spread Samples

Three types of hazelnut spread samples may be prepared. Type I is a "full sugar" control hazelnut spread, which may be similar in composition to typical, commercially available hazelnut spreads. Type II is an inventive, reduced-sugar hazelnut spread containing the inventive protein-sweetener or protein-sweetener concentrate. Type III is a reduced sugar control hazelnut spread, having the identical composition as the Type II inventive, reduced-sugar hazelnut spread, but being devoid of the protein in the sweetener particles.

Each type of hazelnut spread contains sugar, hazelnut paste (15%), palm oil (21.7%), cocoa powder (7.4%) having 12% fat, skim milk powder (6.6%), rapeseed lecithin (0.2%) and flavors or flavorants (0.1%). The sugar content of the Type I hazelnut spread is 49%.

A fructooligosaccharide is used as a filler to make up for the reduced amount of sugar in the Type II and Type III samples. Typically, Gofos™ is utilized.

The Type II hazelnut spread utilizes a sweetener formulation from various exemplary formulations (many of which are described or exemplified hereinabove). Aside from the formulative differences, the preparation process is identical for the inventive hazelnut spread and the control hazelnut spreads.

Example 70A

Typically, the Type II inventive, reduced-sugar hazelnut spread contains about 41% less sugar with respect to the Type I "full sugar" control hazelnut spread. For this exemplary case, the Type II and Type III hazelnut spreads are formulated to contain about (100%-41.2%)·49%=28.8 wt. % sugar. The inulin content of the hazelnut spread is about 20.2 wt. % (49%-29.4%).

Substantially as in the case of the hazelnut spread samples provided hereinabove, in many cases, the Type II inventive, reduced-sugar hazelnut spread may contain reduced sugar in an amount other than the typical reduction of 40%. By way of (non-exhaustive) example, the Type II hazelnut spread may contain 50% less sugar, 35% less sugar, 20% less sugar, or 10% less sugar. Strictly for comparative purposes, the Type II hazelnut spread contains at least 10% less sugar with respect to the Type I "full sugar" control hazelnut spread.

Example 71

Sensory Evaluation

The exemplary sweetener or edible formulations (e.g., muffins, butter cookies and hazelnut spreads) may be evaluated by trained sensory panelists using a paired-comparison test. The paired-comparison test is a two-product blind test, and the panelists' task is to choose/indicate the sweeter one of the two products or samples (Sensory Evaluation Practices, 4$^{th}$ Ed., Stone, Bleibaum, Thomas, eds.). The results are analyzed using binomial distribution tables, which allows the sensory scientist to determine whether perceived differences between the samples are statistically significant.

A Comparative Sweetness Index may be calculated from the paired-comparison test results, compiled from all the panelists. For example, if, among 17 panelists, 10 chose the inventive product as being sweeter, while the other 7 panelists chose the comparative or control product, the Comparative Sweetness Index (CSI) would be calculated as:

$$CSI = (10/17) \cdot 100 = 58.8 = 59 \text{ (rounded)}$$

Example 71A

Another sensory method used to evaluate samples is difference magnitude estimation (DME). Here, each panelist tastes the two samples, choose the sweetest, and also chooses the difference in sweetness, from the following list:

No difference at all
Extremely small difference
Small difference
Moderate difference
Large difference
Extremely large difference Each choice is given a numerical value (0-5), and the average of the panel is calculated (when the first (inventive, protein-containing) sample is indicated as sweeter, the values are taken as positive, and vice versa). Generally, a difference of up to ±1.0 (i.e., within an absolute value of 1), and in some cases, up to ±0.8 or up to ±0.5, is considered to be insignificant (i.e., the sweetness of the samples is substantially the same). An insignificant difference is considered to be a good result for the inventive formulation vs. the control formulation.

Examples 72-81

Various formulations exemplified hereinabove were used to prepare muffin samples, according to Examples 68 and 68A (Type I and Type II). The protein-sweetener concentrates were subjected to size reduction according to Example 2A, and then mixed with ordinary sugar according to Example 3 to obtain the requisite dilution of protein.

Pair-comparison test results of the pair-comparison tests, performed and evaluated according to Examples 71 and 71A, are listed below in Table 1.

TABLE 1

| Example No. | Example No. of Protein-sweetener concentrate | % Protein in Concentrate (Nominal) | % Protein in Concentrate (Actual) | Protein Type | % protein within the sugar particles in the total edible formulation | DME | Comparative Sweetness Index (CSI) |
|---|---|---|---|---|---|---|---|
| 72 | 38 | 30 | 26.4 | Ca-caseinate | 0.1 | 0.18 | 54 |
| 73 | 39 | 50 | 44 | Ca-caseinate | 0.1 | 0.08 | 50 |
| 74 | 40 | 50 | 44 | Ca-caseinate | 0.5 | 0.13 | 67 |
| 75 | 37 | 70 | 61.6 | Ca-caseinate | 0.1 | 0.93 | 73 |
| 76 | 41 | 50 | 44 | Micellar casein | 0.1 | 1.08 | 92 |
| 77 | 36 | 70 | 61.6 | Micellar casein | 0.1 | 0.00 | 50 |
| 78 | 42 | 30 | 23.7 | Rice protein | 0.1 | −0.29 | 43 |
| 79 | 43 | 50 | 39.5 | Rice protein | 0.1 | −0.25 | 42 |
| 80 | 35 | 70 | 55.3 | Rice protein | 0.1 | −0.33 | 47 |
| 81 | 44 | 70 | 55.3 | Rice protein | 0.5 | 0.07 | 47 |

Examples 82-84

The formulations of Examples 11 to 13 (30% rice protein formulation/70% sucrose; 50% rice protein formulation/50% sucrose; and 70% rice protein formulation/30% sucrose, respectively) were prepared using different commercial rice protein products (PROriz80™ for Examples 82 and 84; Oryzatein® for Example 83). Drying was performed in a heated double-jacketed vessel of a vacuum dryer, under constant mixing.

Examples 85-87

Figure 2:
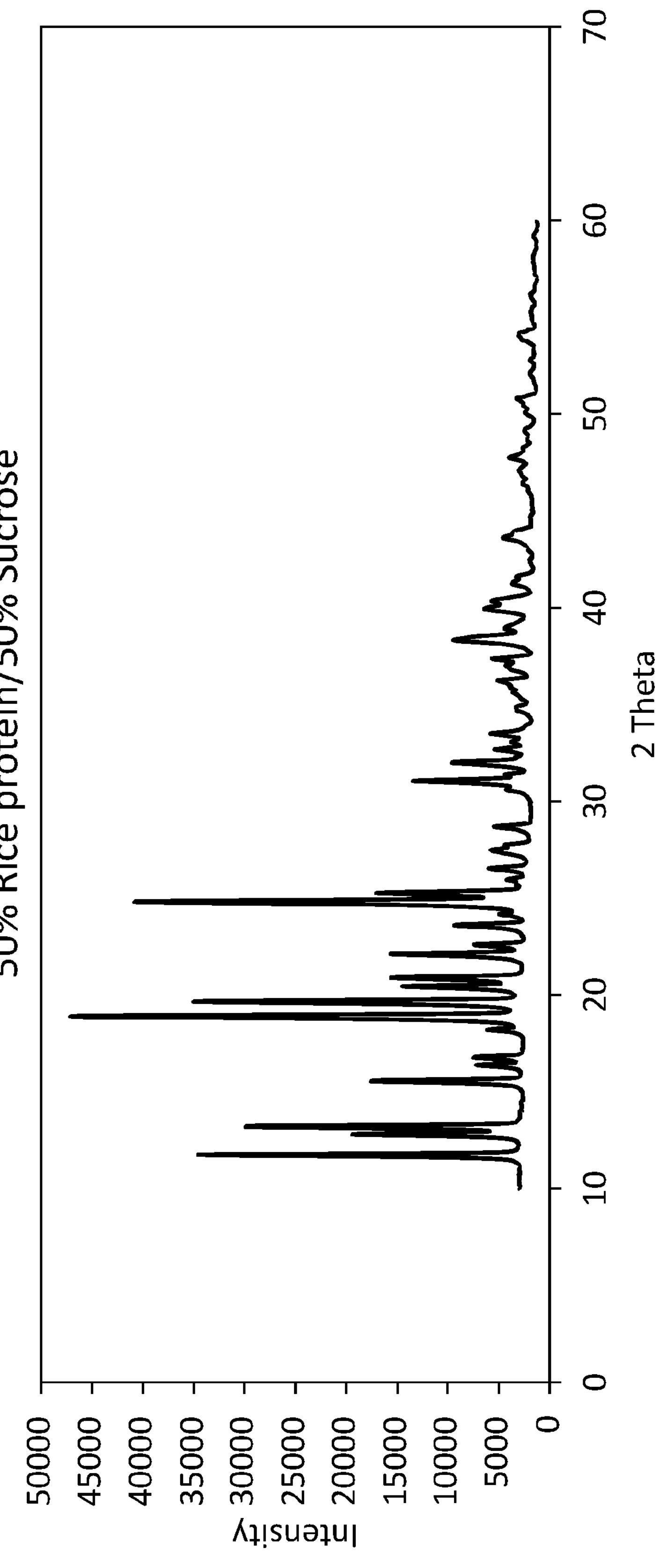
FIG. 2 is an X-ray diffraction (XRD) plot of a solid sweetener concentrate formulation containing 50% rice protein and 50% sucrose, according to an aspect of the present invention.
Figure 3:
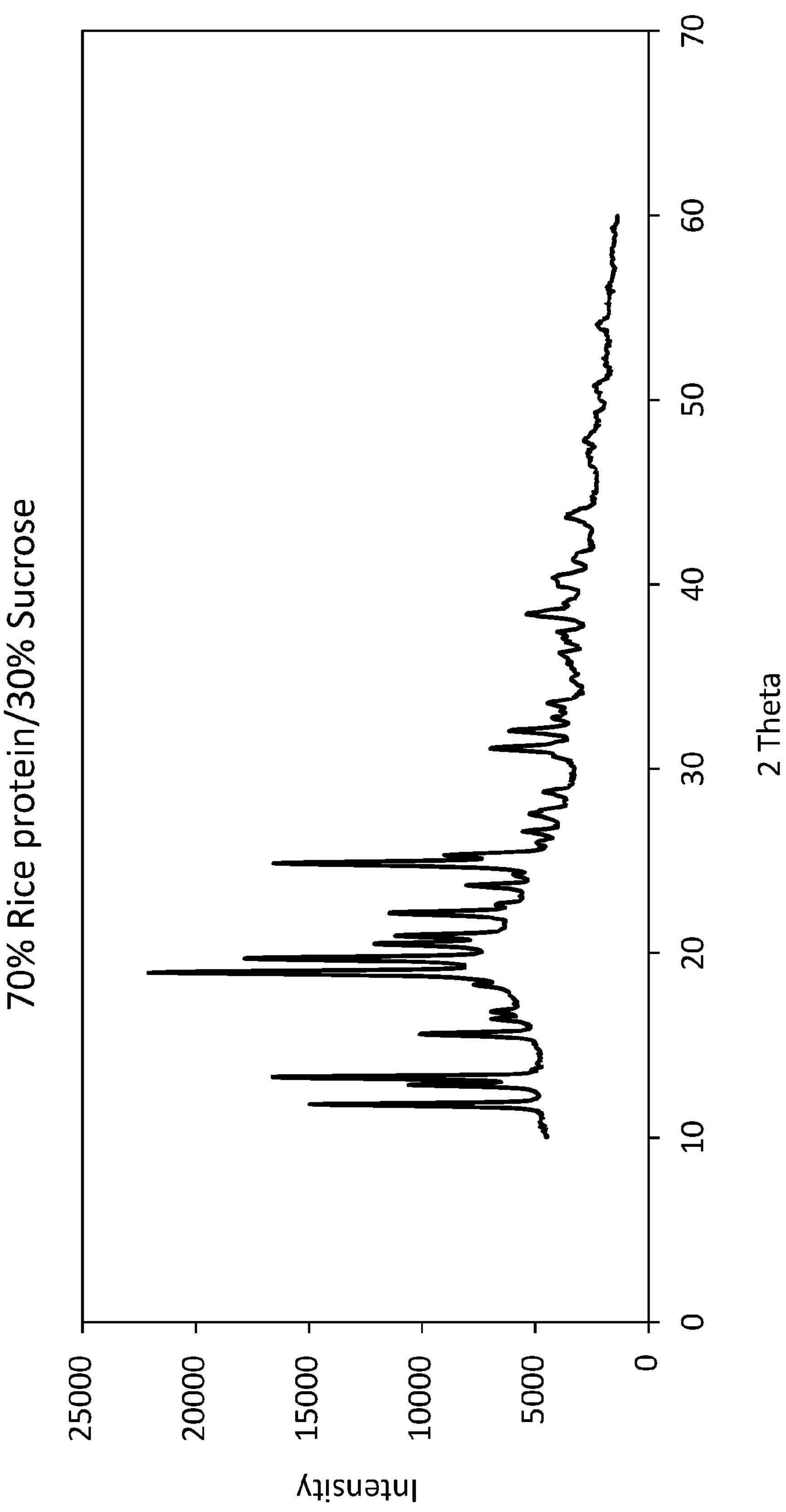
FIG. 3 is an X-ray diffraction (XRD) plot of a solid sweetener concentrate formulation containing 70% rice protein and 30% sucrose, according to an aspect of the present invention.

The dried materials obtained from Examples 82-84 were subjected to X-ray diffraction (XRD) using an X-ray Diffractometer (D8 Advance Series II, Bruker). The respective diffraction patterns for (intensity vs. 2 θ) are plotted in FIGS. 1-3.

All three XRD plots exhibit crystalline character. While it would appear that some amorphous material is present, a portion of the amorphous character may be attributable to the amorphous protein within each sample.

Quantification of the degree of crystallinity, or of the relative quantities of amorphous sweetener vs. crystalline sweetener (e.g., used herein in the specification and in the claims section that follows), may be determined by various analytical procedures known to those skilled in the art, including, but not limited to, the following:

X-ray powder diffraction (XRPD)
Isothermal microcalorimeter (IMC)
Solution calorimetry
Dynamic vapor sorption (DVS)
Conventional differential scanning calorimetry (DSC), Modulated temperature DSC (MTDSC), High speed-DSC (hyper-DSC)
Raman spectroscopy
Near infrared spectroscopy (NIRS)
Solid state nuclear magnetic resonance (SS-NMR)
Inverse phase gas chromatography (IGC)
Density (specific gravity) measurements.

Example 88

A dispersion (slurry) containing 10% micellar casein formulation and 90% sucrose was prepared according to Example 1:100 grams of micellar casein formulation were added gradually to sucrose syrup containing 900 grams sucrose and 500 grams water. The syrup containing the micellar casein was then transferred to the heated double-jacketed vessel of the vacuum dryer, which was heated and maintained under vacuum according to Example 2, to produce a protein-sweetener concentrate as a fine dry powder.

Examples 89-92

Example 89 is a Type I "full sugar" control muffin described in Example 68. Two types of muffin samples were prepared from the protein-sweetener concentrate of Example 88. Both Examples 90 and 91 are Type II "reduced-sugar" muffins containing about 40% less sugar than the Type I control muffin. In Example 90, the protein-sweetener concentrate containing the micellar casein formulation (10%, by weight) was diluted with ordinary sugar according to Example 3, so as to produce the requisite final concentration of sugar (reduced by ~40%) in the muffin. In Example 91, the protein-sweetener concentrate containing the micellar casein formulation (10%, by weight) was added in sufficient quantity to produce the requisite final concentration of sugar (reduced by ~40%) in the muffin, without dilution with ordinary sugar. Example 92 was a Type III reduced sugar control muffin, having the identical composition as the Type II inventive, reduced-sugar muffins, but being devoid of the protein (micellar casein formulation) in the sweetener particles.

Example 92A

Pair-comparison tests were performed and evaluated on the muffins produced according to Examples 89 and 90, according to the evaluation procedure of Example 71. 64% of the sensory panelists found that the muffin containing the inventive diluted protein concentrate (Example 90) was sweeter than the full-sugar control of Example 89.

Example 92B

Pair-comparison tests were performed and evaluated on the muffins produced according to Examples 90 and 91, according to the evaluation procedure of Example 71. All of the sensory panelists found that the muffin containing the inventive diluted protein concentrate (Example 90) was sweeter than the "undiluted" protein-sweetener concentrate "control" of Example 91.

Example 93A

Pair-comparison tests were performed and evaluated on the muffins produced according to Examples 90 and 92, according to the evaluation procedure of Example 71. 80% of the sensory panelists found that the muffin containing the diluted protein concentrate (Example 90) was sweeter than the Type III reduced sugar control muffin of Example 92.

Example 93B

Pair-comparison tests were performed and evaluated on the muffins produced according to Examples 91 and 92, according to the evaluation procedure of Example 71. All of the sensory panelists found that the muffin containing the undiluted protein concentrate (Example 91) was less sweeter than the Type III reduced sugar control muffin of Example 92.

Example 94

Exemplary Starch Content Calculation

A cookie is made from fat (palm oil, 17%), white wheat flour (61%), sucrose (11%), a protein-sweetener concentrate of Example 8 (1%), and a fructan (inulin, 10%). The only starch-containing ingredient is the white wheat flour, which contains about 68% starch. Thus, the starch content of the cookie is 68% of 61%, or about 41.5%.

Example 95

Exemplary Fat Content Calculation

A hazelnut spread is made from fat (palm oil, 24%), sucrose (28%), a protein-sweetener concentrate of Example 11 (2%), pure hazelnut paste (13%, having a 61% fat content), non-fat milk powder (6%), cocoa powder (7% having a 12% fat content) and a fructan (inulin, 20%). The total fat content of the hazelnut spread is 24%+(61% of 13%)+(12% of 7%), or about 32.8%.

Additional Embodiments

Additional numbered Embodiments are provided hereinbelow.

Embodiment 1. A formulation comprising:

sweetener particles, the sweetener particles including:

(a) crystalline sucrose; and (b) optionally, amorphous sucrose;

wherein a total amount of sucrose within the sweetener particles is defined as the crystalline sucrose and the amorphous sucrose;

wherein protein is disposed as protein particles in the sweetener particles; and wherein, within a population of the sweetener particles:

(i) a first weight ratio of the protein to the total amount of sucrose is within a range of 0.01:1 to 20:1; and (ii) a second weight ratio of the amorphous sucrose to the crystalline sucrose is at most 3.3:1.

Embodiment 2. A formulation comprising:

(a) a first population of sweetener particles, each of the sweetener particles containing a first sweetener; and (b) at least one protein disposed as at least one particle in each of the sweetener particles;

wherein, within the first population of sweetener particles, a weight ratio of the at least one protein to the first sweetener is within a range of 1.8:1 to 20:1.

Embodiment 3. A sweet formulation comprising:

(a) sweetener particles containing a first sweetener; and (b) crystalline sugar particles;

wherein at least one protein is disposed within the sweetener particles;

wherein a first weight ratio of said at least one protein to the first sweetener is within a range of 0.01:1 to 20:1;

and wherein, within the sweet formulation, at least 40% of the total amount of sweetener, by weight, is crystalline.

Embodiment 4. A formulation comprising:

a first population of sweetener particles, the sweetener particles including:

(a) crystalline sucrose; and (b) optionally, amorphous sucrose;

wherein a total amount of sucrose within the sweetener particles includes the crystalline sucrose and the amorphous sucrose;

wherein protein is disposed as at least one protein particle in each sweetener particle of the sweetener particles;

and wherein, within the first population of sweetener particles:

(i) a first weight ratio of the protein to the total amount of sucrose is within a range of 0.01:1 to 20:1; and (ii) a second weight ratio of the amorphous sucrose to the crystalline sucrose is at most 3.3:1.

Embodiment 5. The formulation of Embodiment 1 or Embodiment 4, wherein the second weight ratio of the amorphous sucrose to the crystalline sucrose is at most 3.2:1, at most 3.1:1, at most 3.0:1, at most 2.8:1, or at most 2.6:1.

Embodiment 6. The formulation of Embodiment 1 or Embodiment 4, wherein the second weight ratio of the amorphous sucrose to the crystalline sucrose is at most 2.4:1, at most 2.2:1, at most 2.0:1, at most 1.8:1, or at most 1.5:1.

Embodiment 7. The formulation of Embodiment 1 or Embodiment 4, wherein the second weight ratio of the amorphous sucrose to the crystalline sucrose is at most 1.2:1, at most 1.0:1, at most 0.8:1, at most 0.6:1, at most 0.5:1, at most 0.4:1, at most 0.3:1, at most 0.25:1, at most 0.2:1, at most 0.15:1, or at most 0.10:1.

Embodiment 8. A formulation comprising:

(a) a first population of sweetener particles, each of the sweetener particles containing sucrose; and (b) at least one protein disposed as at least one particle in each of the sweetener particles;

wherein, within the first population of sweetener particles, a first weight ratio of the at least one protein to the total concentration of the first sweetener is within a range of 0.01:1 to 20:1;

wherein a protein-sweetener concentrate consisting of the first population of sweetener particles, including the at least one protein, is less sweet with respect to a control sweetener consisting of the first population of sweetener particles, but devoid of the at least one protein;

and wherein, when the protein-sweetener concentrate is diluted with sucrose to produce a protein-sweetener formulation containing 0.1% protein, the protein-sweetener formulation exhibits improved sweetness with respect to a control sucrose formulation.

Embodiment 9. The formulation of any one of Embodiments 1 to 8, wherein, within the sweetener particles or the first population of sweetener particles, the weight ratio of the at least one protein to the first sweetener is within a range of 2:1 to 20:1, 2.2:1 to 20:1, 2.5:1 to 20:1, 3:1 to 20:1, 4:1 to 20:1, or 5:1 to 20:1.

Embodiment 10. The formulation of any one of Embodiments 1 to 9, wherein, within the first population of sweetener particles, the weight ratio of the at least one protein to the first sweetener is at most 15:1, at most 10:1, at most 7:1, or at most 5:1.

Embodiment 11. A sweet formulation comprising:

(a) sweetener particles containing a first sweetener; and (b) crystalline sugar particles;

wherein at least one protein is disposed within the sweetener particles;

wherein a first weight ratio of the at least one protein to the first sweetener is within a range of 0.01:1 to 20:1;

wherein a second weight ratio of the at least one protein, to the first sweetener and the crystalline sugar particles, is within a range of 0.02% to 0.99%;

and wherein, within the sweet formulation, at least 30% of the total amount of sweetener, by weight, is crystalline.

Embodiment 12. A sweet formulation comprising:

(a) sweetener particles containing a first sweetener; and (b) crystalline sugar particles;

wherein at least one protein is disposed within the sweetener particles;

wherein a first weight ratio of the at least one protein to the first sweetener is within a range of 0.01:1 to 20:1;

and wherein, within the sweet formulation, at least 40% of the total amount of sweetener, by weight, is crystalline.

Embodiment 13. A sweet formulation comprising:

(a) sweetener particles containing a first sweetener; and (b) crystalline sugar particles;

wherein at least one protein is disposed within the sweetener particles;

wherein a first weight ratio of the at least one protein to the first sweetener is within a range of 0.01:1 to 20:1;

wherein a total protein weight ($P_{total}$) is defined as the weight of the at least one protein and the weight of any protein disposed within the crystalline sugar particles; and wherein a second weight ratio of the total protein weight ($P_{total}$) to the total weight of the first sweetener and the crystalline sugar particles is within a range of 0.02% to 0.99%.

Embodiment 14. A sweet formulation comprising:
(a) first sweetener particles containing a first sweetener;
(b) second sweetener particles containing a second sweetener; and
(c) at least one protein disposed within the first sweetener particles;

wherein, within the first sweetener particles, a first weight ratio of the at least one protein to the total amount of the first sweetener is within a range of 0.01:1 to 20:1; wherein:

$P_{p1}$ is the average weight of the at least one protein within the first sweetener particles;

$P_{p2}$ is the average weight of any protein disposed within the second sweetener particles;

and wherein a total protein weight ($P_{total}$) in the sweetener particles is defined by $$P_{total}=P_{p1}+P_{p2}$$

and wherein the ratio of the total protein weight ($P_{total}$) to the total weight of sweetener within the sweet formulation is within a range of 0.02% to 0.99%.

Embodiment 15. A sweet formulation comprising:
(a) a first population of first sweetener particles containing a first sweetener;
(b) a second population of second sweetener particles containing a second sweetener; and
(c) at least a first protein disposed within the first population of first sweetener particles, and
(d) optionally, at least a second protein disposed within the second population of second sweetener particles;

wherein, within the first population of first sweetener particles, a first weight ratio of the at least one protein to the total concentration of the first sweetener is within a range of 0.01:1 to 20:1;

wherein, within the second population of second sweetener particles, a second weight ratio of the at least a second protein to the total concentration of the second sweetener is within a range of 0:1 (zero) to 0.005:1;

and wherein the ratio ($R_{p:s-total}$) of a total protein weight ($P_{total}$) of the at least a first and at least a second protein to the total weight of the first and second sweeteners within the first and second populations is within a range of 0.02% to 0.99%.

Embodiment 16. A sweet formulation comprising:
(a) a first population of first sweetener particles containing a first sweetener;
(b) a second population of second sweetener particles containing a second sweetener; and
(c) at least a first protein disposed within the first population of first sweetener particles, and
(d) optionally, at least a second protein disposed within the second population of second sweetener particles;

wherein, within the first population of first sweetener particles, a first weight ratio of the at least one protein to the total concentration of the first sweetener is within a range of 0.01:1 to 20:1;

wherein, within the second population of second sweetener particles, a second weight ratio of the at least a second protein to the total concentration of the second sweetener is within a range of 0:1 (zero) to 0.005:1;

and wherein, within the sweet formulation, at least 30% of the total amount of sweetener, by weight, is crystalline.

Embodiment 17. The formulation of Embodiment 15 or Embodiment 16, wherein the second weight ratio of the at least a second protein to the total concentration of the second sweetener is at most 0.002:1, at most 0.001:1, or at most 0.0005:1.

Embodiment 18. A sweet formulation comprising:
(a) a first population of first sweetener particles containing a first sweetener;
(b) a second population of crystalline sugar particles; and
(c) at least one protein disposed within the first population of first sweetener particles;

wherein, within the first population of first sweetener particles, a first weight ratio of the at least one protein to the total concentration of the first sweetener is within a range of 0.01:1 to 20:1;

and wherein a second weight ratio of a total protein weight ($P_{total}$) of the at least one protein to the total weight of the first sweetener and the crystalline sugar particles is within a range of 0.02% to 5%.

Embodiment 19. The formulation of Embodiment 18, wherein the second weight ratio is within a range of 0.02% to 3%, 0.02% to 2%, or 0.02% to 1.5%.

Embodiment 20. A sweet formulation comprising:
(a) a first population of first sweetener particles containing a first sweetener;
(b) a second population of second sweetener particles containing crystalline sugar; and
(c) at least one protein disposed within the first population of first sweetener particles;

wherein, within the first population of first sweetener particles, a first weight ratio of the at least one protein to the total concentration of the first sweetener is within a range of 0.01:1 to 20:1;

wherein:

$P_{p1}$ is the weight of the at least one protein within the first population of first sweetener particles;

$P_{p2}$ is the weight of any protein disposed within the second population of second sweetener particles;

and wherein a total protein weight ($P_{total}$) in the sweetener particles is defined by $$P_{total}=P_{p1}+P_{p2}$$

and wherein the ratio of the total protein weight ($P_{total}$) to the total weight of sweetener within the sweet formulation is within a range of 0.02% to 0.99%.

Embodiment 21. A sweet formulation comprising:
(a) a first population of first sweetener particles containing a first sweetener;
(b) a second population of second sweetener particles containing a second sweetener; and
(c) at least one protein disposed within the first population of first sweetener particles, and optionally, within the second population of second sweetener particles;

wherein, within the first population of first sweetener particles, a first weight ratio of the at least one protein to the total concentration of the first sweetener is within a range of 0.01:1 to 20:1;

wherein a protein-sweetener concentrate consisting of the first population of first sweetener particles, including the at least one protein, is less sweet with respect to a control sweetener consisting of the first population of first sweetener particles, but devoid of the at least one protein;

and wherein the sweet formulation exhibits improved sweetness with respect to a control sucrose formulation.

Embodiment 22. A sweet formulation comprising:

(a) a first population of first sweetener particles containing a first sweetener;

(b) a second population of second sweetener particles containing a second sweetener; and (c) at least one protein disposed within the first population of first sweetener particles, and optionally, within the second population of second sweetener particles;

wherein, within the first population of first sweetener particles, a first weight ratio of the at least one protein to the total concentration of the first sweetener is within a range of 0.010:1 to 20:1;

wherein a protein-sweetener concentrate consisting of the first population of first sweetener particles, including the at least one protein, is less sweet with respect to a control sweetener consisting of the first population of first sweetener particles, but devoid of the at least one protein;

and wherein the sweet formulation exhibits improved sweetness with respect to a control sucrose formulation.

Embodiment 23. A sweet formulation comprising:

(a) a first population of first sweetener particles containing a first sweetener;

(b) a second population of second sweetener particles containing a second sweetener; and (c) at least one protein disposed within the first population of first sweetener particles, and optionally, within the second population of second sweetener particles;

wherein, within the first population of first sweetener particles, a first weight ratio of the at least one protein to the total concentration of the first sweetener is within a range of 0.01:1 to 20:1;

wherein at least one of:

(i) the ratio of the total protein weight within the first and second populations ($P_{total}$), to the total weight of sweetener within the sweet formulation; and (ii) the ratio of the total protein weight within the sweet formulation, to the total weight of sweetener within the sweet formulation;

is within a range of 0.02% to 0.99%;

and wherein the predominant sweetener within the sweet formulation is crystalline.

Embodiment 23A. The formulation of Embodiment 23, wherein a protein-sweetener concentrate consisting of the first sweetener particles, including the at least one protein, is less sweet with respect to a control sweetener consisting of the first population of first sweetener particles, but devoid of the at least one protein.

Embodiment 24. A sweet formulation comprising:

(a) a first population of first sweetener particles containing a first sweetener, and at least one protein disposed within the first population of first sweetener particles; and (b) ordinary sugar;

wherein, within the first population of first sweetener particles, a first weight ratio of the at least one protein to the total concentration of the first sweetener is within a range of 0.01:1 to 20:1;

wherein the ratio of the total protein weight within the first population, to the total weight of sweetener within the sweet formulation, is within a range of 0.02% to 0.99%;

and wherein the predominant sweetener within the sweet formulation is the ordinary sugar.

Embodiment 25. The formulation of any one of Embodiments 11 to 24, wherein, when the formulation is provided within a first edible formulation, the first edible formulation exhibits improved sweetness with respect to a control edible formulation.

Embodiment 26. The formulation of any one of Embodiments 11 to 25, wherein the formulation exhibits improved sweetness with respect to a control sweetener formulation that is identical to the sweet formulation, but devoid of the at least one protein.

Embodiment 27. The formulation of any one of Embodiments 11 to 26, wherein the ratio of a or the total protein weight to the total weight of sweetener within the formulation is at most 0.8%, at most 0.6%, at most 0.5%, at most 0.45%, at most 0.4%, at most 0.35%, at most 0.3%, or at most 0.25%.

Embodiment 28. The formulation of any one of Embodiments 11 to 27, wherein the weight ratio of a or the total protein weight to the total weight of the first sweetener and crystalline sugar particles is within a range of 0.02% to 0.8%, 0.02% to 0.7%, 0.02% to 0.6%, 0.02% to 0.55%, or 0.02% to 0.5%.

Embodiment 29. The formulation of any one of Embodiments 11 to 27, wherein the weight ratio of a or the total protein weight to the total weight of the first sweetener and crystalline sugar particles is within a range of 0.02% to 0.45%, 0.02% to 0.40%, 0.02% to 0.35%, 0.02% to 0.30%, 0.02% to 0.25%.

Embodiment 30. The formulation of any one of Embodiments 11 to 29, wherein, within the formulation, at least 70%, at least 80%, at least 90%, or at least 95%, of the total amount of sweetener, by weight, is crystalline.

Embodiment 31. The formulation of any one of Embodiments 11 to 29, wherein, within the formulation, at least 96%, at least 98%, or at least 99%, or at least 95% of the total amount of sweetener, by weight, is crystalline.

Embodiment 32. The formulation of any one of Embodiments 11 to 31, wherein, when the formulation is provided within a first edible formulation, the first edible formulation exhibits improved sweetness with respect to a control edible formulation.

Embodiment 33. The formulation of any one of Embodiments 11 to 32, wherein, within the second population of second sweetener particles, or within the second sweetener particles, a second weight ratio of any of the at least one protein disposed within the second population of second sweetener particles, to the total concentration of the second sweetener, is within a range of 0:1 (zero) to 0.005:1.

Embodiment 34. The formulation of Embodiment 33, the second weight ratio of the at least a second protein to the total concentration of the second sweetener is at most 0.002:1, at most 0.001:1, or at most 0.0005:1.

Embodiment 35 The formulation of any one of Embodiments 1 to 34, wherein, within the formulation, at least 45%, at least 50%, at least 60%, or at least 75% of the total amount of sweetener, by weight, is crystalline.

Embodiment 36. The formulation of any one of Embodiments 1 to 35, wherein a volume-based average particle size of the formulation ($D_v50$) is within a range of 90 to 1000 μm, 100 to 1000 μm, 110 to 1000 μm, or 125 to 1000 μm.

Embodiment 37. The formulation of any one of Embodiments 1 to 35, wherein a volume-based average particle size of the formulation ($D_V50$) is within a range of 150 to 1000 μm, 175 to 1000 μm, 200 to 1000 μm, 250 to 1000 μm, 90 to 750 μm, 100 to 750 μm, 125 to 750 μm, 150 to 750 μm, 200 to 750 μm, 90 to 600 μm, 100 to 600 μm, 125 to 600 μm, 90 to 450 μm, 100 to 450 μm, 125 to 450 μm, 90 to 250 μm, 100 to 250 μm, or 125 to 250 μm.

Embodiment 38. A food formulation comprising:
- (a) sweetener particles containing a first sweetener, and at least one protein disposed within the sweetener particles;
- (b) crystalline sugar;
- (c) at least one fat; and
- (d) optionally, at least one starch;

wherein a total concentration of the first sweetener, the crystalline sugar, the at least one fat, and the at least one starch, within the food formulation, is at least 20%, on a weight basis;

wherein the food formulation exhibits improved sweetness with respect to a control edible formulation that is identical to the food formulation, but devoid of the at least one protein;

and wherein, within the food formulation, at least 60% of the total amount of sweetener, by weight, is crystalline.

Embodiment 39. A food formulation comprising:
- (a) first sweetener particles containing a first sweetener, and at least one protein disposed within the first sweetener particles;
- (b) second sweetener particles containing a second sweetener;
- (c) at least one fat; and
- (d) optionally, at least one starch;

wherein a total concentration of the first and second sweeteners, the at least one fat, and the at least one starch, within the food formulation, is at least 20%, on a weight basis;

wherein the food formulation exhibits improved sweetness with respect to a control edible formulation that is identical to the food formulation, but devoid of the at least one protein;

and wherein, within the food formulation, at least 50% of the total amount of sweetener, by weight, is crystalline.

Embodiment 40. A food formulation comprising:
- (a) first sweetener particles containing a first sweetener, and at least one protein disposed within the first sweetener particles;
- (b) second sweetener particles containing crystalline sugar;
- (c) at least one fat; and
- (d) optionally, at least one starch;

wherein a total concentration of the first sweetener, the ordinary sugar, the at least one fat, and the at least one starch, within the food formulation, is at least 20%, on a weight basis;

wherein the food formulation exhibits improved sweetness with respect to a control edible formulation that is identical to the food formulation, but devoid of the at least one protein;

and wherein the predominant sweetener within the food formulation is the crystalline sugar.

Embodiment 41. The formulation of any one of the preceding Embodiments, wherein, within the formulation, at least 65%, at least 70%, at least 80%, at least 85%, at least 90%, or at least 95% of the total amount of sweetener, by weight, is crystalline.

Embodiment 42. The formulation of any one of the preceding Embodiments, wherein, within the sweet formulation, at least 96%, at least 97%, at least 98%, or at least 99% of the total amount of sweetener, by weight, is crystalline.

Embodiment 43. The formulation of any one of the previous Embodiments, wherein the first sweetener and the at least one protein make up at least 40% of the formulation.

Embodiment 44. The formulation of any one of the previous Embodiments, wherein the first sweetener and the at least one protein make up at least 50% of the formulation.

Embodiment 45. The formulation of any one of the previous Embodiments, wherein the first sweetener and the at least one protein make up at least 60% of the formulation.

Embodiment 46. The formulation of any one of the previous Embodiments, wherein the first sweetener and the at least one protein make up at least 70% of the formulation.

Embodiment 47. The formulation of any one of the previous Embodiments, wherein the first sweetener and the at least one protein make up at least 80% of the formulation.

Embodiment 48. The formulation of any one of the previous Embodiments, wherein the first sweetener and the at least one protein make up at least 85% of the formulation.

Embodiment 49. The formulation of any one of the previous Embodiments, wherein the first sweetener and the at least one protein make up at least 90% of the formulation.

Embodiment 50. The formulation of any one of the previous Embodiments, wherein the first sweetener and the at least one protein make up at least 95% of the formulation.

Embodiment 51. The formulation of any one of the previous Embodiments, wherein the at least one protein includes a globular protein.

Embodiment 52. The formulation of Embodiment 51, wherein the globular protein includes a globulin protein.

Embodiment 53. The formulation of Embodiment 51 or Embodiment 52, wherein the globular protein includes an albumin protein.

Embodiment 54. The formulation of any one of Embodiments 1 to 53, wherein the at least one protein includes a storage protein such as a seed storage protein.

Embodiment 55. The formulation of any one of Embodiments 1 to 54, wherein the at least one protein includes a prolamin protein.

Embodiment 56. The formulation of Embodiment 55, wherein the prolamin protein includes a glutelin protein.

Embodiment 57. The formulation of any one of the previous Embodiments, wherein the at least one protein includes at least one of a 2S albumin protein, a 7S vicilin protein, and an 11S legumin protein.

Embodiment 58. The formulation of any one of the previous Embodiments, wherein the at least one protein includes.

Embodiment 59. The formulation of any one of the previous Embodiments, wherein the at least one protein includes.

Embodiment 60. The formulation of any one of the previous Embodiments, wherein the at least one protein includes a 15S globulin protein.

Embodiment 61. The formulation of any one of the previous Embodiments, wherein the at least one protein includes at least one of an 8S convicilin protein, a γ-conglutin protein, and a β-conglutin protein.

Embodiment 62. The formulation of any one of the previous Embodiments, wherein the at least one protein includes an ovalbumin protein.

Embodiment 63. The formulation of any one of the previous Embodiments, wherein the at least one protein includes a beta-lactoglobulin protein.

Embodiment 64. The formulation of any one of the previous Embodiments, wherein the at least one protein includes a serum albumin.

Embodiment 65. The formulation of any one of the previous Embodiments, wherein the at least one protein includes an egg protein.

Embodiment 66. The formulation of any one of the previous Embodiments, wherein the at least one protein includes a milk protein.

Embodiment 67. The formulation of Embodiment 66, wherein the milk protein includes a casein.

Embodiment 68. The formulation of Embodiment 67, wherein the casein includes a micellar casein.

Embodiment 69. The formulation of Embodiment 67 or Embodiment 68, wherein the casein includes a caseinate.

Embodiment 70. The formulation of Embodiment 69, wherein the caseinate is a metal caseinate.

Embodiment 71. The formulation of Embodiment 69 or Embodiment 70, wherein the caseinate includes a form of $R^{+1}$-caseinate, wherein R has a nominal valence of 1.

Embodiment 72. The formulation of any one of Embodiments 69 to 71, wherein the caseinate includes a form of $R^{+2}$-(caseinate) 2, wherein R has a nominal valence of 2.

Embodiment 73. The formulation of any one of Embodiments 69 to 72, wherein the caseinate includes a form of $R^{+3}$-(caseinate) 3, wherein R has a nominal valence of 3.

Embodiment 74. The formulation of any one of Embodiments 69 to 73, wherein the caseinate includes calcium caseinate.

Embodiment 75. The formulation of any one of Embodiments 69 to 74, wherein the caseinate includes sodium caseinate.

Embodiment 76. The formulation of any one of Embodiments 69 to 75, wherein the caseinate includes potassium caseinate.

Embodiment 77. The formulation of any one of Embodiments 69 to 76, wherein the caseinate includes a caseinate selected from the group of caseinates consisting of magnesium caseinate, ammonium caseinate, and chromium caseinate.

Embodiment 78. The formulation of any one of Embodiments 67 to 77, wherein the casein includes an acid casein.

Embodiment 79. The formulation of any one of Embodiments 66 to 78, wherein the milk protein includes an α-lactalbumin.

Embodiment 80. The formulation of any one of Embodiments 66 to 79, wherein the milk protein includes a β-lactoglobulin.

Embodiment 81. The formulation of any one of Embodiments 66 to 80, wherein the milk protein includes at least one immunoglobulin.

Embodiment 82. The formulation of any one of Embodiments 66 to 81, wherein the milk protein includes at least one proteose peptone.

Embodiment 83. The formulation of any one of the previous Embodiments, wherein the at least one protein includes a vegetable protein.

Embodiment 84. The formulation of Embodiment 83, wherein the vegetable protein includes a pea protein.

Embodiment 85. The formulation of Embodiment 83 or Embodiment 84, wherein the vegetable protein includes a rice protein.

Embodiment 86. The formulation of any one of Embodiments 83 to 85, wherein the vegetable protein includes a chickpea protein.

Embodiment 87. The formulation of any one of Embodiments 83 to 86, wherein the vegetable protein includes a mung bean protein.

Embodiment 88. The formulation of any one of the preceding Embodiments, wherein the first sweetener includes allulose.

Embodiment 89. The formulation of any one of the preceding Embodiments, wherein the sweetener carbohydrate includes sucrose.

Embodiment 90. The formulation of any one of the preceding Embodiments, wherein the sweetener carbohydrate is predominantly sucrose.

Embodiment 91. The formulation of any one of the preceding Embodiments, wherein the sweetener carbohydrate includes glucose.

Embodiment 92. The formulation of any one of the preceding Embodiments, wherein the sweetener carbohydrate includes fructose.

Embodiment 93. The formulation of any one of the preceding Embodiments, wherein the sweetener polyol is selected from at least one of the group consisting of xylitol, maltitol, erythritol, sorbitol, threitol, arabitol, hydrogenated starch hydrolysates (HSH), isomalt, lactitol, mannitol, and galactitol (dulcitol).

Embodiment 94. The formulation of any one of the preceding Embodiments, wherein the sweetener formulation is in the form of a particulate solid such as a free-flowing powder.

Embodiment 95. The formulation of Embodiment 94, wherein the particulate solid is a powder.

Embodiment 96. The sweetener formulation of any one of the preceding Embodiments, wherein the concentration of silicon within the sweetener formulation is at most 0.2%, at most 0.1%, or at most 0.05%.

Embodiment 97. The sweetener formulation of any one of the preceding Embodiments, wherein the concentration of silicon within the sweetener formulation is at most 0.02%.

Embodiment 98. The sweetener formulation of any one of the preceding Embodiments, wherein the concentration of silicon within the sweetener formulation is at most 0.01%, at most 0.005%, or at most 0.003%.

Embodiment 99. A food formulation containing the formulation of any one of Embodiments 1 to 98.

Embodiment 100. A food formulation comprising:

(a) a first population of sweetener particles containing a first sweetener selected from the group consisting of a first sweetener carbohydrate and a first sweetener polyol;

(b) at least one protein disposed within the sweetener particles;

(c) at least one fat; and (d) optionally, at least one starch;

wherein a total concentration of the first sweetener, the at least one fat, and the at least one starch, within the edible formulation, is at least 30%, on a weight basis.

Embodiment 101. An edible formulation comprising:

(a) a first population of sweetener particles containing a first sweetener selected from the group consisting of a first sweetener carbohydrate and a first sweetener polyol;

(b) a second population of sweetener particles containing a second sweetener selected from the group consisting of a second sweetener carbohydrate and a second sweetener polyol; and (c) at least one protein disposed within the first population of sweetener particles;

(d) at least one fat; and (e) optionally, at least one starch;

wherein a weight-to-weight ratio of total protein content to the second sweetener within the second population of sweetener particles is at most 0.1%; and wherein a total weight-to-weight ratio of total protein content to the first and second sweeteners within the first and second populations is within a range of 0.02% to 0.99%.

Embodiment 102. A food formulation comprising:

(a) a first population of sweetener particles containing a first sweetener including a first sweetener carbohydrate;

(b) at least one protein disposed within the sweetener particles;

(c) at least one fat; and (d) optionally, at least one starch;

wherein a total concentration of the first sweetener, the at least one fat, and the at least one starch, within the edible formulation, is at least 30%, on a weight basis.

Embodiment 103. A food formulation comprising:

(a) a first population of sweetener particles containing a first sweetener including a first sweetener carbohydrate;

(b) a second population of sweetener particles containing a second sweetener selected from the group consisting of a second sweetener carbohydrate and a second sweetener polyol; and (c) at least one protein disposed within the first population of sweetener particles;

(d) at least one fat; and (e) optionally, at least one starch;

wherein a second weight-to-weight ratio of total protein content to the second sweetener within the second population of sweetener particles is at most 0.1%;

and wherein a total weight-to-weight ratio of total protein content to the first and second sweeteners within the first and second populations is within a range of 0.02% to 0.99%.

Embodiment 104. The formulation of any one of Embodiments 100 to 103, wherein a total concentration of the first sweetener, a or the second sweetener, the at least one fat, and the at least one starch, within the edible formulation, is at least 32%, on a weight basis.

Embodiment 105. The formulation of any one of Embodiments 100 to 104, wherein a weight content of the first sweetener and a or the second sweetener, within the edible formulation is at least 8%.

Embodiment 106. The formulation of any one of Embodiments 100 to 105, the edible formulation containing a total of at least 5% of the first sweetener and a or the second sweetener, and at least 5% of the at least one fat.

Embodiment 107. The formulation of any one of Embodiments 100 to 106, the edible formulation containing a total of at least 5% of the first sweetener and a or the second sweetener, and at least 5% of the at least one starch.

Embodiment 108. The formulation of any one of Embodiments 100 to 107, wherein a weight concentration of all sweetener particles within the edible formulation is within a range of 10% to 80%.

Embodiment 109. The formulation of any one of the preceding Embodiments, the edible formulation containing at least 5% of the first sweetener and a or the second sweetener, at least 5% of a or the at least one fat, and at least 5% of a or the at least one starch.

Embodiment 110. The formulation of any one of the preceding Embodiments, the edible formulation containing at least 2%, at least 5%, or at least 10% of an edible filler.

Embodiment 111. The formulation of any one of the preceding Embodiments, the edible formulation containing at least one edible filler.

Embodiment 112. The formulation of Embodiment 111, the at least one edible filler including a dietary fiber.

Embodiment 113. The formulation of Embodiment 111 or Embodiment 112, the at least one edible filler including a soluble fiber.

Embodiment 114. The formulation of Embodiment 111, the at least one edible filler including a polysaccharide.

Embodiment 115. The formulation of Embodiment 114, the polysaccharide including a fructan.

Embodiment 116. The formulation of Embodiment 115, the polysaccharide including inulin.

Embodiment 117. The formulation of any one of the preceding Embodiments, the edible formulation containing at least one edible filler including an oligosaccharide.

Embodiment 118. The formulation of Embodiment 117, the oligosaccharide including a fructooligosaccharide.

Embodiment 119. The formulation of any one of the preceding Embodiments, the edible formulation containing at least one edible filler including a soluble fiber, the soluble fiber including resistant maltodextrin.

Embodiment 120. The formulation of any one of the preceding Embodiments, the edible formulation containing at least one edible filler including a soluble fiber, the soluble fiber including polydextrose.

Embodiment 121. The formulation of any one of the preceding Embodiments, containing at least 10% of the first sweetener and a or the second sweetener, at least 10% of a or the at least one fat, and at least 10% of a or the at least one starch.

Embodiment 122. The formulation of any one of the preceding Embodiments, wherein the first reduced sugar edible (or food) formulation is a standard reduced sugar edible formulation.

Embodiment 123. The formulation of any one of the preceding Embodiments, wherein the first edible (or food) formulation is a standard reduced sugar edible formulation.

Embodiment 124. The formulation of any one of the preceding Embodiments, wherein a protein-sweetener concentrate consisting of said sweetener particles, including said at least one protein, when provided within a standard reduced sugar edible formulation, is less sweet with respect to a standard reduced sugar control edible formulation that is identical to said standard reduced sugar edible formulation, but devoid of said at least one protein.

Embodiment 125. The formulation of any one of the preceding Embodiments, wherein, when the entire sweet formulation is provided within said standard reduced sugar edible formulation, said standard reduced sugar formulation exhibits improved sweetness with respect to said standard reduced sugar edible formulation.

Embodiment 126. The formulation of any one of the preceding Embodiments, wherein a protein-sweetener concentrate consisting of said sweetener particles, including said at least one protein, is less sweet with respect to a first control sweetener that is identical to said protein-sweetener concentrate, but devoid of said at least one protein.

Embodiment 127. The formulation of any one of the preceding Embodiments, wherein the sweet formulation exhibits improved sweetness with respect to a second control sweetener that is identical to the sweet formulation, but devoid of said at least one protein.

Embodiment 128. The formulation of any one of the preceding Embodiments, wherein at least 60% of the total amount of sweetener, by weight, is crystalline.

Embodiment 129. The formulation of any one of the preceding Embodiments, wherein at least 90% of the total amount of sweetener, by weight, is crystalline.

Embodiment 130. The formulation of any one of the preceding Embodiments, wherein a second weight ratio of a total protein weight ($P_{total}$) of said at least one protein in said sweetener particles and any protein disposed in said crystalline sugar particles, to the total weight of said first sweetener and said crystalline sugar particles, is within a range of 0.02% to 20%.

Embodiment 131. The formulation of Embodiment 130, wherein said second weight ratio is within a range of 0.02% to 10%.

Embodiment 132. The formulation of Embodiment 130, wherein said second weight ratio is within a range of 0.02% to 3%.

Embodiment 133. The formulation of any one of the preceding Embodiments, wherein, within said sweetener particles, a weight ratio R is defined by $$R = Wsucrose-a/Wsucrose-c,$$

wherein:

Wsucrose-a is the weight of any amorphous sucrose; and

Wsucrose-c is the weight of the crystalline sucrose;

and wherein R is at most 3.3:1.

Embodiment 134. The formulation of Embodiment 133, wherein R is at most at most 1.5:1.

Embodiment 135. The formulation of Embodiment 133, wherein R is at most at most 0.8:1.

Embodiment 136. A food or edible formulation comprising:

(a) the sweet formulation of any one of the preceding claims;

(b) at least one fat; and (c) optionally, at least one starch;

wherein a total concentration of said first sweetener, said crystalline sugar, said at least one fat, and said at least one starch, within the food formulation, is at least 20%, on a weight basis;

wherein the food formulation exhibits improved sweetness with respect to a control edible formulation that is identical to the food formulation, but devoid of the at least one protein;

and wherein, within the food formulation, at least 60% of the total amount of sweetener, by weight, is crystalline.

Embodiment 137. The formulation of Embodiment 136, or any previous Embodiment, wherein at least 95% of the total amount of sweetener, by weight, within the formulation, is crystalline.

Embodiment 138. The formulation of Embodiment 136 or 137, or any previous Embodiment, wherein a total weight content of sweeteners within the formulation is within a range of 10% to 80%.

Embodiment 139. The formulation of any one of Embodiments 136 to 138, or any previous Embodiment, the formulation containing at least 5% of said at least one fat.

Embodiment 139A. The formulation of any one of Embodiments 136 to 138, or any previous Embodiment, the formulation containing at least 10% of said at least one fat.

Embodiment 139B. The formulation of any one of Embodiments 136 to 138, or any previous Embodiment, the formulation containing at least 20% of said at least one fat.

Embodiment 139C. The formulation of any one of Embodiments 136 to 139B, or any previous Embodiment, the formulation containing at most 60% of said at least one fat.

Embodiment 139D. The formulation of Embodiment 139C, containing at most 50% of said at least one fat.

Embodiment 140. The formulation of Embodiment 139, or any previous Embodiment, containing at least 5% of said at least one starch.

Embodiment 140A. The formulation of Embodiment 140, containing at least 8% of said at least one starch.

Embodiment 140B. The formulation of Embodiment 140, containing at least 12% of said at least one starch.

Embodiment 140C. The formulation of any one of Embodiments 140 to 140B, the formulation containing at most 30% of said at least one starch.

Embodiment 140D. The formulation of any one of Embodiments 140 to 140B, the formulation containing at most 25% of said at least one starch.

Embodiment 141. The formulation of any one of Embodiments 136 to 140D, or any previous Embodiment, the edible formulation containing at least 2% of an edible filler.

Embodiment 141A. The formulation of Embodiment 141, containing at least 4% of of said edible filler.

Embodiment 141B. The formulation of Embodiment 141, containing at least 6% of said edible filler.

Embodiment 141C. The formulation of any one of Embodiments 141 to 141B, the formulation containing at most 50% of said at least one edible filler.

Embodiment 141D. The formulation of any one of Embodiments 141 to 141B, the formulation containing at most 35% of said at least one edible filler.

Embodiment 141E. The formulation of any one of Embodiments 141 to 141B, the formulation containing at most 20% of said at least one edible filler.

Embodiment 142. The formulation of any one of Embodiments 136 to 141C, or any previous Embodiment, the formulation having an edible filler content within a range of 2 to 50%.

Embodiment 143. The formulation of any one of Embodiments 136 to 141E, or any previous Embodiment, wherein a total concentration of said first sweetener, said crystalline sugar, said at least one fat, said at least one starch, and said and said edible filler, within the food formulation, is at least 50%, on a weight basis.

Embodiment 144. The formulation of any one of Embodiments 136 to 142, or any previous Embodiment, wherein a total concentration of said first sweetener, said crystalline sugar, said at least one fat, said at least one starch, and said and said edible filler, within the food formulation, is at least 70%, on a weight basis.

Embodiment 145. The formulation of any one of Embodiments 136 to 144, or any previous Embodiment, wherein said edible filler is a dietary fiber.

Embodiment 146. The formulation of any one of Embodiments 136 to 145, or any previous Embodiment, wherein said control edible formulation is a standard reduced sugar control edible formulation.

Embodiment 147. The formulation of any one of Embodiments 136 to 146, or any previous Embodiment, wherein the food or edible formulation is a flour confection.

Embodiment 148. The formulation of any one of Embodiments 136 to 147, or any previous Embodiment, wherein the food formulation or edible formulation is a sugar confection.

Embodiment 149. The formulation of any one of Embodiments 136 to 148, or any previous Embodiment, wherein the food formulation contains 4-18% edible filler (such as dietary fiber), 5-15% fat, 5-25% starch, and 3-20% sweetener (such as sugar).

Embodiment 150. The formulation of any one of Embodiments 136 to 148, or any previous Embodiment, wherein the food formulation contains 4-18% edible filler (such as dietary fiber), 10-55% fat, and 3-20% sweetener (such as sugar).

Embodiment 151. A method of producing the formulation of any one of the preceding Embodiments, substantially as described herein.

As used herein in the specification and in the claims section that follows, the term "milk protein" is meant to include a native protein typically found in the milk of at least one mammal, and most typically, in the milk of at least one of cows, goats and sheep. The term "milk protein" is also meant to include non-native milk proteins, including a denatured protein of the native protein, or, a modified protein of the native protein, as will be appreciated by those of skill in the art. An example of a non-native milk protein is calcium caseinate.

For the avoidance of doubt, it is emphasized that the term "denatured protein" (or "denatured milk protein" and the like) does not include disruption to the primary protein structure, such as disruption to the sequence of amino acids held together by covalent peptide bonds.

As used herein in the specification and in the claims section that follows, the term "starch" is meant to include edible starches that are used or may be used in foodstuffs. Typically, such starches include at least one of amylose and amylopectin, and more typically, both amylose and amylopectin. It will be appreciated that various modifications of starch may be made, in order to impart to a particular foodstuff, or to the starch therein, specific chemical and/or physical properties, including, by way of example, the prevention of gelling at cold temperatures, withstanding low pH, or resistance to high shear or to high temperatures.

Often, starch is present in an ingredient, e.g., flour. In white wheat flour, the starch content is typically about 68%. In oats, the starch content is typically about 58%.

In addition to including fats that are solid at room temperature (25° C.), e.g., beef fat, shortening, palm oil, and butter, as used herein in the specification and in the claims section that follows, the term "fat" is meant to include edible oils, including those that are liquid at room temperature, e.g., cooking oils. Specific examples of edible oils are olive oil, walnut oil, corn oil, and cottonseed oil.

Fats may be a separate ingredient, or may be an ingredient within a food ingredient. For example, hazelnut paste and cocoa powder both contain fat.

Average particle size (D50) may be based on the number of particles in the population ("$D_N50$") or may be based on the volume of particles ($D_V50$). These measurements may be obtained by various known methods including static light scattering (SLS), dynamic light scattering (DLS), sieving, and various methods of microscopy. Some methods may be preferred for larger ranges of particles, others may be preferred for smaller ranges of particles.

As used herein in the specification and in the claims section that follows, the term "percent", or "%", refers to percent by weight, unless specifically indicated otherwise. However, with specific regard to formulations containing at least one protein and at least one sweetener, the weight-percent of the protein is with respect to the sweetener. By way of example, in such a formulation containing 1.95 grams calcium caseinate dispersed in a syrup containing 650 grams sucrose and 350 grams water, the weight-percent of calcium caseinate is 1.95/650=0.3%.

As used herein in the specification and in the claims section that follows, the term "a first sweetener" refers to at least one sweetener selected from the group consisting of a first sweetener carbohydrate and a first sweetener polyol.

As used herein in the specification and in the claims section that follows, the term "a second sweetener" refers to at least one sweetener selected from the group consisting of a first sweetener carbohydrate and a first sweetener polyol, wherein the chemical identity of the second sweetener may be identical to the "first sweetener", unless otherwise indicated.

As used herein in the specification and in the claims section that follows, the term "predominant", "predominantly", and the like, with respect to a sweetener, refers to the sweetener having the highest concentration, by weight or by volume.

As used herein in the specification and in the claims section that follows, the term "predominant", "predominantly", and the like, e.g., with respect to a morphology of a species within a formulation, such as a sweetener species, refers to the particular morphology of that sweetener species having the highest concentration, by weight or by volume, within the formulation.

As used herein in the specification and in the claims section that follows, the term "ordinary sugar" is used as known in the art, and, for the avoidance of doubt, is meant to include various kinds of crystalline sucrose products, including table sugar, white sugar, brown sugar, raw sugar, and whole cane sugar.

The term "ordinary sugar" is not meant to limit the particle size distribution. However, the $D_{50}$ of "ordinary sugar" is typically within the range of 100 μm to 1000 μm.

As used herein in the specification and in the claims section that follows, the term "concentration" refers to concentration on a weight basis, unless specifically indicated otherwise.

As used herein in the specification and in the claims section that follows, the term "protein-sweetener concentrate" refers to a population of sweetener particles containing a sweetener selected from the group consisting of a sweetener carbohydrate and a sweetener polyol; and at least one protein disposed within the sweetener particles; wherein a weight-to-weight ratio of the at least one protein to the sweetener within the population of sweetener particles is within a range of 1% to 95%. Typically such concentrates contain at least 10% protein.

As used herein in the specification and in the claims section that follows, the term "reduced sugar", "less sugar" and the like, refers to a lower relative amount of sugar. Thus, if a Type II reduced-sugar muffin contains 40% less sugar with respect to a Type I "full sugar" control muffin, and the Type I muffin contains 21.8% sugar, the Type II reduced-sugar muffin contains 60% (100%-40%) of the sugar contained in the Type I muffin, i.e., 0.60·21.8%=13.08 wt. % sugar.

As used herein in the specification and in the claims section that follows, the term "less sweet", typically used with respect to a protein-sweetener concentrate vs. a control sweetener, refers to a lower sweetness result as exhibited by the Comparative Sweetness Index calculated from paired-comparison test results, as described in Example 71.

Similarly, the term "sweeter", "improved sweetness", and the like, refers to a higher or improved sweetness result as exhibited by the Comparative Sweetness Index calculated from those paired-comparison test results.

As used herein in the specification and in the claims section that follows, the term "reduced sugar edible formulation", "first reduced sugar edible formulation", or the like, refers to any one of the reduced sugar products as formulated according to any one of Examples 68-68A, 69-69A, and 70-70A.

As used herein in the specification and in the claims section that follows, the term "reduced sugar control edible formulation" refers to any one of the reduced sugar control products as formulated according to any one of Examples 68-68B, 69-69B, and 70-70B.

As used herein in the specification and in the claims section that follows, the term "standard reduced sugar edible formulation" refers to any one of the reduced sugar products as formulated according to any one of Examples 68A, 69A, and 70A, in which the sugar reduction is about 40%.

As used herein in the specification and in the claims section that follows, the term "standard reduced sugar control edible formulation" refers to any one of the reduced sugar "Type III" control products as formulated according to any one of Examples 68, 69, and 70, and as further delineated in Examples 68A, 69A, and 70A, respectively.

As used herein in the specification and in the claims section that follows, the term "exhibits improved sweetness" and the like, typically with reference to a first edible formulation (e.g., a reduced sugar edible formulation) containing a protein-sweetener concentrate relative to a control edible formulation (e.g., a reduced sugar control edible formulation) that is identical to the edible formulation, but devoid of the protein contained in that protein-sweetener concentrate, refers to a higher sweetness result as exhibited by the Comparative Sweetness Index calculated from paired-comparison test results, as described in Example 71. For evaluation purposes, the concentration of protein from the protein-sweetener concentrate distributed within the first edible formulation is 0.1%, 0.3%, or 0.5%, typically 0.1%.

As used herein in the specification and in the claims section that follows, the term "sugar confection" is meant to refer to sweets such as candies and chocolates.

As used herein in the specification and in the claims section that follows, the terms "flour confections" and "bakers' confection" are meant to refer to sweet pastries, cakes, cookies, and the like. Such flour confections typically contain a high percentage of flour. As used herein in the specification and in the claims section that follows, the term "majority", with respect to the number of particles of a formulation component, refers to at least 50%, by number.

As used herein in the specification and in the claims section that follows, the term "majority", with respect to the concentration of a formulation component, refers to at least 50%, by weight.

The term "ratio", as used herein in the specification and in the claims section that follows, refers to a weight ratio, unless specifically indicated otherwise.

The modifier "about" and "substantially" used in connection with a quantity is inclusive of the stated value and has the meaning dictated by the context (for example, it includes at least the degree of error associated with the measurement of the particular quantity). When used with a specific value, it should also be considered as disclosing that value.

In the context of the present application and claims, the phrase "at least one of A and B" is equivalent to an inclusive "or", and includes any one of "only A", "only B", or "A and B". Similarly, the phrase "at least one of A, B, and C" is equivalent to an inclusive "or", and includes any one of "only A", "only B", "only C", "A and B", "A and C", "B and C", or "A and B and C".

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A sweetener formulation comprising:

(a) a first population of sweetener particles containing a first sweetener; and (b) a second population of crystalline sugar particles;

said crystalline sugar particles of said second population differing from said sweetener particles of said first population;

wherein at least one protein is disposed within said sweetener particles;

wherein a first weight ratio of said at least one protein to said first sweetener is within a range of 0.01:1 to 20:1;

wherein said first sweetener is selected from the group of sweeteners consisting of sweetener carbohydrates and sweetener polyols;

and wherein, within the sweetener formulation, at least 40% of the total amount of sweetener, by weight, is crystalline.

2. The sweetener formulation of claim 1, wherein a protein-sweetener concentrate consisting of said sweetener particles, including said at least one protein, when provided within a standard reduced sugar edible formulation, is less sweet with respect to a standard reduced sugar control edible formulation that is identical to said standard reduced sugar edible formulation, but devoid of said at least one protein.

3. The sweetener formulation of claim 2, wherein, when the entire sweetener formulation is provided within said standard reduced sugar edible formulation, said standard reduced sugar formulation exhibits improved sweetness with respect to said standard reduced sugar edible formulation.

4. The sweetener formulation of claim 1, wherein a protein-sweetener concentrate consisting of said sweetener particles, including said at least one protein, is less sweet with respect to a first control sweetener that is identical to said protein-sweetener concentrate, but devoid of said at least one protein.

5. The sweetener formulation of claim 4, wherein the sweetener formulation exhibits improved sweetness with respect to a second control sweetener that is identical to the sweetener formulation, but devoid of said at least one protein.

6. The sweetener formulation of claim 1, wherein at least 90% of the total amount of sweetener, by weight, is crystalline.

7. The sweetener formulation of claim 1, wherein a second weight ratio of a total protein weight ($P_{total}$) of said at least one protein in said sweetener particles and any protein disposed in said crystalline sugar particles, to the total weight of said first sweetener and said crystalline sugar particles, is within a range of 0.02% to 20%.

8. The sweetener formulation of claim 7, wherein, within said sweetener particles, a weight ratio R is defined by $$R = Wsucrose\text{-}a/Wsucrose\text{-}c,$$

wherein:

Wsucrose-a is the weight of any amorphous sucrose; and

Wsucrose-c is the weight of the crystalline sucrose;

and wherein R is at most 3.3:1.

9. The sweetener formulation of claim 8, wherein R is at most at most 0.8:1.

10. The sweetener formulation of claim 9, wherein said first weight ratio is within a range of 2:1 to 20:1.

11. The sweetener formulation of claim 7, wherein said first weight ratio is within a range of 2.5:1 to 10:1.

12. The sweetener formulation of claim 1, wherein a protein-sweetener concentrate containing said sweetener particles contains at least 10% protein, by weight.

13. The sweetener formulation of claim 1, wherein said crystalline sugar particles are ordinary sugar.

14. The sweetener formulation of claim 1, wherein the sweetener formulation is in the form of a particulate solid.

15. A food formulation comprising:

(a) the sweetener formulation of claim 1;

(b) at least one fat; and (c) optionally, at least one starch;

wherein a total concentration of said first sweetener, said crystalline sugar, said at least one fat, and said at least one starch, within the food formulation, is at least 20%, on a weight basis;

wherein the food formulation exhibits improved sweetness with respect to a control edible formulation that is identical to the food formulation, but devoid of said at least one protein;

and wherein, within the food formulation, at least 60% of the total amount of sweetener, by weight, is crystalline.

16. The food formulation of claim 15, wherein a total weight content of sweeteners within the food formulation is within a range of 10% to 80%.

17. The food formulation of claim 16, the food formulation containing at least 5% of said at least one fat.

18. The food formulation of claim 16, the food formulation containing at least 5% of an edible filler.

19. The food formulation of claim 18, wherein a total concentration of said first sweetener, said crystalline sugar, said at least one fat, said at least one starch, and said edible filler, within the food formulation, is at least 50%, on a weight basis.

20. The food formulation of claim 15, wherein the food formulation is selected from the group consisting of a flour confection and a sugar confection.

* * * * *